(12) United States Patent
Sugawara et al.

(10) Patent No.: US 8,353,374 B2
(45) Date of Patent: Jan. 15, 2013

(54) BATTERY MODULE, BATTERY DEVICE, ELECTRIC MOTOR DRIVE SYSTEM AND VEHICLE

(75) Inventors: Tatsuo Sugawara, Hitachinaka (JP); Seiichi Satoh, Tochigi (JP); Yoshihisa Tsurumi, Hitachinaka (JP); Masato Isogai, Mito (JP); Sadashi Seto, Hitachinaka (JP)

(73) Assignees: Hitachi Vehicle Energy, Ltd., Hitachinka-shi (JP); Hitachi, Ltd., Tokyo (JP)

( * ) Notice: Subject to any disclaimer, the term of this patent is extended or adjusted under 35 U.S.C. 154(b) by 498 days.

(21) Appl. No.: 12/613,941

(22) Filed: Nov. 6, 2009

(65) Prior Publication Data

US 2010/0116570 A1 May 13, 2010

(30) Foreign Application Priority Data

Nov. 7, 2008 (JP) ................................. 2008-286819

(51) Int. Cl.
*B60K 1/00* (2006.01)
(52) U.S. Cl. ..................... 180/65.1; 180/68.5
(58) Field of Classification Search ................ 180/68.1, 180/68.5, 65.1; 429/58, 63, 86, 87, 88, 84, 429/159, 175, 160
See application file for complete search history.

(56) References Cited

U.S. PATENT DOCUMENTS

| 2,505,207 | A | * | 4/1950 | Riggs | 429/84 |
| 3,762,958 | A | * | 10/1973 | Kuylenstierna | 429/160 |
| 3,879,227 | A | * | 4/1975 | Hennen | 429/86 |
| 4,207,387 | A | * | 6/1980 | Jutte | 429/88 |
| 4,374,187 | A | * | 2/1983 | Sano | 429/175 |
| 5,679,478 | A | * | 10/1997 | Hancock et al. | 429/63 |
| 5,840,439 | A | * | 11/1998 | Fritts et al. | 429/84 |
| 5,843,593 | A | * | 12/1998 | Fritts et al. | 429/84 |
| 6,541,154 | B2 | * | 4/2003 | Oogami et al. | 429/159 |
| 7,631,712 | B2 | * | 12/2009 | Watanabe | 180/68.5 |
| 7,964,300 | B2 | * | 6/2011 | Nakazawa et al. | 429/58 |
| 2005/0147874 | A1 | * | 7/2005 | Andersen et al. | 429/87 |

FOREIGN PATENT DOCUMENTS

| JP | 2004-14421 A | 1/2004 |
| JP | 2009-164085 A | 7/2009 |

* cited by examiner

*Primary Examiner* — Hau Phan
(74) *Attorney, Agent, or Firm* — Crowell & Moring LLP

(57) ABSTRACT

A battery module includes: a plurality of battery cells; a casing in which the plurality of battery cells are housed; a plurality of conductive members used to electrically connect the plurality of battery cells; a first chamber, formed in the casing, in which the plurality of battery cells are disposed; and a second chamber, formed in the casing and isolated from the first chamber, into which emitted matter from the battery cells is released, wherein: the conductive members and the battery cells are connected together within the second chamber.

14 Claims, 15 Drawing Sheets

ROAD SURFACE

BATTERY MODULE, BATTERY DEVICE, ELECTRIC MOTOR DRIVE SYSTEM AND VEHICLE

INCORPORATION BY REFERENCE

The disclosure of the following priority application is herein incorporated by reference:
Japanese Patent Application No. 2008-286819 filed Nov. 7, 2008

BACKGROUND OF THE INVENTION

1. Field of the Invention

The present invention relates to technologies adopted in conjunction with a battery module that includes a plurality of cells and more specifically, it relates to a technology for improving the battery cell cooling performance, a technology for improving the level of venting performance with regard to gas generated by the battery cells.

2. Description of Related Art

A safety valve is disposed in a battery cell such as a lithium ion battery used in a hybrid electric car, a pure electric car or the like. The safety valve is designed to open as an abnormal condition such as internal short-cut or an overcharge causes an increase in the internal pressure at the battery. As the safety valve opens, the electrical connection between the terminal and the electrode is cut off and a gas (e.g., a carbon oxide gas) is discharged from the battery. While the gas is harmless, it is not desirable that it be released into the cabin of the vehicle and is, therefore, released into a passage or a chamber that is separate from a cooling medium passage through which the medium used to cool the battery cell is distributed, so as to ensure that the gas will not be released within the vehicle. The gas is then led outside the vehicle via a piping or the like. Japanese Laid Open Patent Publication No. 2004-14421 (patent reference 1) discloses a battery module adopting such a separation structure.

In the battery module disclosed in patent reference 1, three spaces, i.e., a first space through which a cell cooling medium flows, a second space into which the gas discharged from the cells is released and a third space where a connecting plate that electrically connects a plurality of cells is installed, are formed in sequence inside the battery module case. Thus, since the ends of the cells, ranging through the second space, are present in the third space, the cooling medium flowing through the first space contacts the cells over a small contact area, i.e., a small cooling area, in the battery module disclosed in patent reference 1.

In addition, a pipe through which the gas released into the second space is guided to the outside of the battery module is disposed over an upper area of the battery module disclosed in patent reference 1. However, the gas is emitted from the cells as a vapor containing the electrolyte. Thus, while the gas emitted from the cells can be expelled through the pipe, any liquid such as the electrolyte in the gas cannot be expelled and instead is collected at the bottom of the second space in the battery module disclosed in patent reference 1.

SUMMARY OF THE INVENTION

A battery module according to a first aspect of the present invention, comprises: a plurality of battery cells; a casing in which the plurality of battery cells are housed; a plurality of conductive members used to electrically connect the plurality of battery cells; a first chamber, formed in the casing, in which the plurality of battery cells are disposed; and a second chamber, formed in the casing and isolated from the first chamber, into which emitted matter from the battery cells is released, wherein: the conductive members and the battery cells are connected together within the second chamber.

According to a second aspect of the present invention, in the battery module according to the first aspect, the first chamber may constitute a passage through which a medium used to cool the plurality of battery cells is distributed.

According to a third aspect of the present invention, the battery module according to the first aspect may further comprise a discharge mechanism, disposed at the casing, that discharges the emitted matter through a bottom area of the second chamber and guides the emitted matter to an external piping.

According to a fourth aspect of the present invention, the battery module according to the first aspect may further comprise: a support member that supports the plurality of battery cells by holding the battery cells on two sides; and a shield member disposed on a side of the support member opposite from a battery cell holding side on which the battery cells are held, wherein: the second chamber is formed with the support member holding the plurality of battery cells and the shield member covering the support member on the side opposite from the battery cell holding side.

According to a fifth aspect of the present invention, in the battery module according to the fourth aspect, it is preferable that a seal member is inserted between the support member and each of the plurality of battery cells so as to fully isolate the first chamber and the second chamber from each other.

According to a sixth aspect of the present invention, in the battery module according to the fourth aspect, it is preferable that a seal member is inserted between the support member and the shield member so as to fully isolate the second chamber from outside.

According to a seventh aspect of the present invention, in the battery module according to the fourth aspect, the support member may be made of an insulating material; and the conductive members may be embedded in the support member.

According to a eighth aspect of the present invention, in the battery module according to the fourth aspect may further comprise a plurality of voltage detection lines via which voltages at the plurality of battery cells are detected, wherein: the voltage detection lines are laid out on the battery cell holding side of the support member and are connected to portions of the conductive members that are exposed on the battery cell holding side of the support member.

According to a ninth aspect of the present invention, in the battery module according to the fourth aspect, it is preferable that the conductive members are connected with the battery cells from side of the support member opposite from the battery cell holding side; and through holes, through which the emitted matter having been released from the battery cells toward the second chamber passes, are formed at portions of the conductive members facing opposite the battery cells.

A battery module according to a tenth aspect of the present invention, comprises: a plurality of battery cells; a casing in which the plurality of battery cells are housed; a plurality of conductive members used to electrically connect the plurality of battery cells; a first chamber, formed in the casing, in which the plurality of battery cells are disposed; and a second chamber, formed in the casing and isolated from the first chamber, into which emitted matter from the battery cells is released, wherein: the plurality of conductive members are disposed against a direction in which the emitted matter is released from the battery cells toward the second chamber and each includes a through hole through which the emitted matter passes.

A battery module according to an eleventh aspect of the present invention, comprises: a plurality of battery cells; a casing in which the plurality of battery cells are housed; a first chamber, formed in the casing, in which the plurality of battery cells are disposed; a second chamber, formed in the casing and isolated from the first chamber, into which emitted matter from the battery cells is released; and a discharge mechanism, disposed at the casing, that discharges the emitted matter through a bottom portion of the second chamber and guides the emitted matter to an external piping.

A battery module according to a twelfth aspect of the present invention, comprises: a plurality of battery cells; a casing in which the plurality of battery cells are housed; a plurality of conductive members used to electrically connect the plurality of battery cells; a support member that supports the plurality of battery cells by holding the battery cells on two sides; and a shield member disposed on a side of the support member opposite from a battery holding side on which the battery cells are held, wherein: a first chamber in which the plurality of battery cells are disposed and a second chamber into which emitted matter from the battery cells is released, are respectively formed in the casing on one side and on another side of the support member functioning as a partitioning wall; the first chamber constitutes a passage through which a medium used to cool the plurality of battery cells passes; a discharge mechanism that discharges the emitted matter through a bottom area of the second chamber and guides the emitted matter to an external piping is disposed at the support member; and the conductive members and the battery cells are connected together within the second chamber.

A battery device according to a thirteenth aspect of the present invention, comprises: a battery module, according to the first aspect, equipped with a plurality of battery cells; and a controller that detects voltages at the plurality of battery cells and controls extents to which the plurality of battery cells are charged.

A battery device constituting an on-vehicle power source, according to a fourteenth aspect of the present invention, comprises: a battery module, according to the first aspect, equipped with a plurality of battery cells; and a controller that detects voltages at the plurality of battery cells and controls extents to which the plurality of battery cells are charged, wherein: the battery module is connected with a piping installed in a vehicle so as to extend from the vehicle toward a road on which the vehicle travels, and the emitted matter having been emitted from the battery cells is discharged from the vehicle via the piping.

An electric motor drive system according to a fifteenth aspect of the present invention, comprises: an electric motor that generates motive power; a battery device that supplies drive power used to drive the electric motor; and a power conversion device that controls drive of the electric motor by controlling the power supplied to the electric motor, wherein: the battery device comprises a battery module, according to the first aspect, equipped with a plurality of battery cells, and a controller that detects voltages at the plurality of battery cells and controls extents to which the plurality of battery cells are charged.

A vehicular electric motor drive system according to a sixteenth aspect of the present invention, comprises: an electric motor installed in a vehicle and generates vehicle drive motive power; a battery device that supplies drive power to be used to drive the electric motor; and a power conversion device that controls drive of the electric motor by controlling the drive power, wherein: the battery device includes a battery module, according to claim 1, equipped with a plurality of battery cells, and a controller that detects voltages at the plurality of battery cells and controls extents to which the plurality of battery cells are charged; and the battery module is connected to a piping installed in the vehicle so as to extend toward a road on which the vehicle travels, and the emitted matter having been emitted from the battery cells is discharged from the vehicle via the piping.

A vehicle having installed therein a piping extending from inside the vehicle toward a road traveled by the vehicle, through which exhaust is guided and discharged from the vehicle, according to a seventeenth aspect of the present invention, comprises: an electric motor that generates vehicle drive motive power; a battery device that supplies drive power to be used to drive the electric motor; and a power conversion device that controls drive of the electric motor by controlling the drive power, wherein: the battery device comprises a battery module, according to the first aspect, equipped with a plurality of battery cells, and a controller that detects voltages at the plurality of battery cells and controls extents to which the plurality of battery cells are charged; and the battery module is connected to the piping, and emitted matter having been emitted from the battery cells is discharged to the piping as the exhaust.

DESCRIPTION OF PREFERRED EMBODIMENTS

The following is a description of the embodiments of the present invention.

In the embodiments described below, the present invention is adopted in a battery device constituting an on-vehicle power source device in an electrically driven vehicle or, more specifically, an electric car.

The electric car described in reference to the embodiments is a hybrid electric car equipped with both an internal combustion engine and an electric motor, used as vehicle drive sources. However, the structure explained below may be adopted in other types of electric cars, including a pure electric car that uses an electric motor as the sole drive source for the vehicle.

The battery device constituting the on-vehicle power source device described below in reference to the embodiments is a lithium ion battery device that includes a plurality of lithium ion battery cells. However, the structure described below may be adopted in a battery device that employs battery cells of a different type similar to lithium ion battery cells in that they each include a safety valve for reducing the pressure in the battery cell.

The structure described below in reference to either embodiment may be adopted in battery devices constituting vehicle power source devices for other types of electrically driven vehicles, e.g., railway trains such as hybrid trains, public transportation vehicles such as buses, freight vehicles such as trucks and industrial vehicles such as battery-operated fork lift trucks.

Furthermore, the structure described below in reference to either embodiment may be adopted in battery devices constituting power source devices for systems other than electrically driven vehicles, e.g., uninterruptible power supply units used in computer systems and server systems and power source devices used in non-utility power generation installations.

The embodiments of the present invention are now described in specific detail in reference to drawings.

-First Embodiment-

The first embodiment of the present invention is described in reference to FIGS. 1 through 13.

Figure 12:
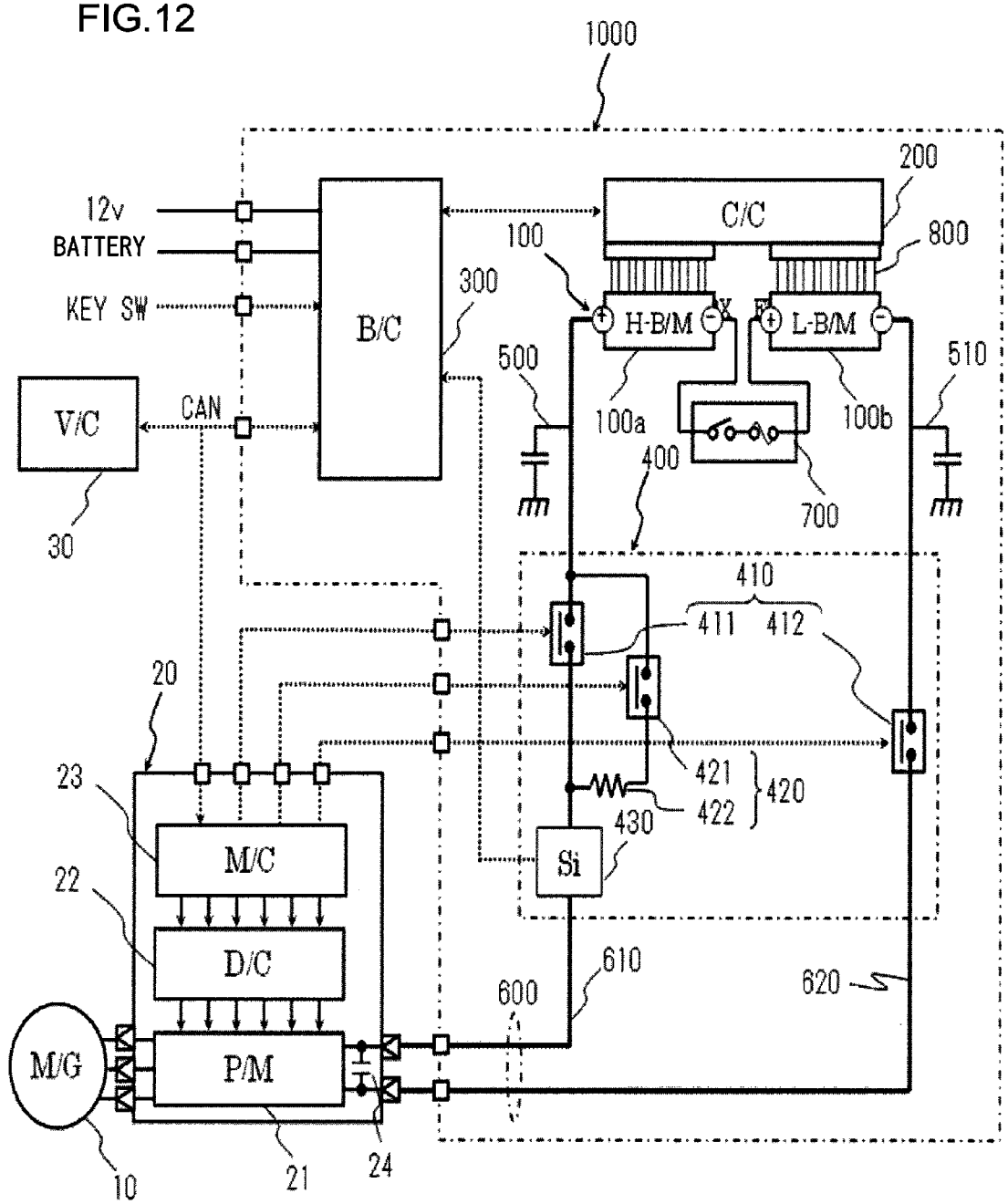
FIG. 12 is a block diagram showing the structure of an on-vehicle electrical system that includes the lithium ion battery device shown in FIG. 5.

First, in reference to FIG. 12, the structure adopted in the on-vehicle electrical system (electric motor drive system) is described.

The on-vehicle electrical system achieved in the embodiment drives a motor generator 10, which is a 3-phase AC synchronous machine, as a motor and supplies the rotational motive power thus generated to drive targets such as the wheels and the internal combustion engine in an operation mode that requires rotational motive power, e.g., when the vehicle is engaged in power running operation or when starting up the internal combustion engine. In such an operation mode, DC power originating from a lithium ion battery device 1000, i.e., the battery device constituting the on-vehicle power source device, is converted to 3-phase AC power via an inverter device 20 constituting a power conversion device and the 3-phase AC power is then supplied to the motor generator 10 in the on-vehicle electrical system achieved in the embodiment.

In addition, in an operation mode requiring power generation, e.g., when the vehicle is decelerating or being braked in a regeneration mode, or when the lithium ion battery device 1000 needs to be charged, the motor generator 10 is used as a generator and is driven with a drive force from the wheels or the engine so as to generate 3-phase AC power in the on-vehicle electrical system achieved in the embodiment. In such an operation mode, the on-vehicle electrical system in the embodiment converts the 3-phase AC power originating from the motor generator 10 to DC power via the inverter device 20 and then supplies the DC power to the lithium ion battery device 1000. The power thus supplied to the lithium ion battery device 1000 is accumulated in the lithium ion battery device 1000.

The motor generator 10 is an electrical machine engaged in operation through the magnetic interaction of an armature (e.g., a stator) and a magnetic field generator (e.g., a rotor) rotatably supported at a position facing opposite the armature. A rotating shaft of the magnetic field generator is mechanically connected to a rotating shaft of a drive target such as the wheels or the engine so as to enable exchange of rotational motive power with the drive target.

The armature is a component that generates a rotational magnetic field with the 3-phase AC power supplied thereto when the motor generator 10 is driven as a motor and generates 3-phase AC power through inter-linkage of magnetic fluxes when driving the motor generator 10 as a generator. It includes an armature core (stator core) constituted of a magnetic material and 3-phase armature windings (stator windings or stator coil) wound around the armature core.

The magnetic field generator is a component that generates a magnetic field flux when the motor generator 10 is driven as a motor or generator, and includes a field core (rotor core) constituted of magnetic material and either a permanent magnet or a field winding (rotor winding or field coil) disposed at the field core or both a permanent magnet and a field winding. A magnetic flux is generated as the field winding becomes excited with a field current supplied thereto from an external source.

The inverter device 20 is an electronic circuit device that controls the power conversion mentioned earlier (the conversion of DC power to 3-phase AC power and the conversion of 3-phase AC power to DC power) by turning ON/OFF switching semiconductor elements. The inverter device includes a power module 21, a driver circuit 22, a motor controller 23 and a smoothing capacitor 24.

The power module 21, equipped with six switching semiconductor elements, is a power conversion circuit via which the power conversion described earlier is executed as the six switching semiconductor elements are switched (turned ON/OFF). The switching semiconductor elements may be metal oxide semiconductor field effect transistors (MOSFETs) or insulated gate bipolar transistors (IGBTs). While the switching semiconductor elements constituted with MOSFETs each include a parasitic diode connected between the drain electrode and the source electrode in an electrically anti-parallel configuration, a separate diode must be connected between the collector electrode and the emitter electrode in an electrically anti-parallel configuration in the switching semiconductor element constituted with an IGBT. The power conversion circuit is configured as a 3-phase bridge circuit that includes serial circuits corresponding to three phases and is electrically connected in parallel, with each serial circuit equipped with two switching semiconductor elements (an upper arm and a lower arm corresponding to a given phase) electrically connected in series.

The end of each upper arm, located on the side opposite from the side that connects with the corresponding lower arm, is electrically connected to a DC positive pole-side module terminal, whereas the end of each lower arm, located on the side opposite from the side connected with the corresponding upper arm, is electrically connected with a DC negative pole-side module terminal. The middle point in each set of upper and lower arms, i.e., the side at which the upper arm and the lower arm are connected, is electrically connected to an AC-side module terminal. The DC positive pole-side module terminal and the DC negative pole-side module terminal are electrically connected respectively with a DC positive-side external terminal and a DC negative pole-side external terminal. The DC positive pole-side external terminal and the DC negative pole-side external terminal are power source-side terminals via which DC power is exchanged with the lithium ion battery device 1000, and a power cable 600 extending from the lithium ion battery device 1000 is electrically connected to the power source-side terminals. The AC side module terminal is electrically connected with an AC side external terminal. The AC side external terminal is a load-side terminal via which 3-phase AC power is exchanged with the motor generator 10, and a load cable extending from the motor generator 10 is electrically connected to the load-side terminal.

In order to regulate high-speed switching operation of the switching semiconductor elements constituting the power conversion circuit and suppress fluctuations of the voltage attributable to the parasitic inductance in the power conversion circuit, the smoothing capacitor 24 is connected between the DC positive pole-side and the DC negative pole-side of the power conversion circuit in an electrically parallel configuration. The smoothing capacitor 24 may be an electrolytic capacitor or a film capacitor.

The motor controller 23, which is an electronic circuit device engaged in control of the switching operation of the six switching semiconductor elements constituting the power conversion circuit, generates switching operation command signals (e.g., PWM (pulse width modulation) signals) for the six switching semiconductor elements based upon a torque command output from a higher-order controller, e.g., a vehicle controller 30 that controls the entire vehicle. The command signals thus generated are output to the driver circuit 22.

Based upon the switching operation command signals output thereto from the motor controller 23, the driver circuit 22 generates drive signals for the six switching semiconductor elements constituting the power conversion circuit. The drive signals generated by the driver circuit are output to the gate electrodes of the six switching semiconductor elements constituting the power conversion circuit. As a result, the six switching semiconductor elements constituting the power conversion circuit are switched (turned ON/OFF) under control executed based upon the drive signals output from the driver circuit 22.

The lithium ion battery device 1000 includes a battery module 100 that accumulates and releases electric energy (charges and discharges DC power) and a controller that manages and controls the condition of the battery module 100.

The battery module 100 is constituted with two battery blocks (battery packs), i.e., a high potential-side battery block 100a and a low potential-side battery block 100b that are electrically connected in series. An assembled battery is housed in each battery block. The assembled batteries are each constituted with a plurality of lithium ion battery cells electrically connected in series.

An SD (service disconnect) switch 700 is installed between the negative pole-side (low potential side) of the high potential-side battery block 100a and the positive pole-side (high potential side) of the low potential-side battery block 100b. The SD switch 700 is a safety device installed so as to assure safety when performing maintenance and inspection of the lithium ion battery device 1000. It is constituted with an electrical circuit with a switch and a fuse electrically connected in series and is operated when a service person performs maintenance and inspection.

The controller is constituted with a battery controller 300 designated as a higher-order (master) unit and a cell controller 200 designated as a lower-order (slave) unit.

The battery controller 300 manages and controls the condition of the lithium ion battery device 1000 and also provides information indicating the condition of the lithium ion battery device 1000 and a charge/discharge control command indicating, for instance, the allowable charge/discharge levels to a higher-order controller. The condition of the lithium ion battery device 1000 is managed and controlled by measuring the voltage and the current at the lithium ion battery device 1000, determining through arithmetic operation the state of charge (SOC) and the state of health (SOH) at the lithium ion battery device 1000, measuring the temperatures of the individual battery blocks and outputting commands for the cell controller 200 (e.g., a command for measuring the voltage at each lithium ion battery cell and a command for adjusting the quantity of power stored in each lithium ion battery cell). The higher-order controller in this case may be the vehicle controller 30 or the motor controller 23.

The cell controller 200, constituted with a plurality of integrated circuits (ICs), functions as the arms of the battery controller 300 as it manages and controls the conditions of the plurality of lithium ion battery cells based upon commands provided from the battery controller 300. The conditions in the plurality of lithium ion battery cells are managed and controlled by measuring the voltages at the individual lithium ion battery cells, adjusting the levels of power stored in the individual lithium ion battery cells and the like. A plurality of lithium ion battery cells is assigned to each integrated circuit, which controls and manages the conditions of the corresponding lithium ion battery cells.

An auxiliary battery (a lead battery with a nominal output voltage of 12 V in the case of an automobile) installed as the power source for on-vehicle accessories such as lamps and an audio system, is used as the power source for the battery controller 300. Thus, the voltage (e.g., 12 V) from the auxiliary battery is applied to the battery controller 300. The voltage applied to the battery controller 300 is lowered (to, for instance, 5V), via a power circuit constituted with a DC-DC converter (DC-DC power converter) and the voltage thus lowered is applied as a drive voltage to electronic components constituting the battery controller 300. The electronic components constituting the battery controller 300 are thus engaged in operation with the drive voltage applied thereto.

The plurality of lithium ion battery cells is used as the power source for the corresponding integrated circuit in the cell controller 200. For this reason, the cell controller 200 and the battery module 100 are electrically connected via connection lines 800. The voltage corresponding to the maximum potential among the potentials at the corresponding plurality of lithium ion battery cells is applied to each integrated circuit via the connection lines 800. The voltage applied to the integrated circuit is lowered (to, for instance, 5V) via a power circuit and the lowered voltage is then used as the operating power in the integrated circuit.

A signal output from an ignition key switch is input to the battery controller 300. The signal output from the ignition key switch is used as a signal indicating that the lithium ion battery device 1000 is to be started up or stopped.

As the ignition key switch enters an ON state, the power circuit in the battery controller 300 is engaged in operation based upon the signal output from the ignition key switch and the plurality of electronic circuit components operate on the drive voltage from the power circuit applied thereto. As a result, the battery controller 300 is started up. Once the battery controller 300 is started up, a startup command is output from the battery controller 300 to the cell controller 200. At the cell controller 200, the power circuits in the plurality of integrated circuits are engaged in operation in sequence based upon the startup command from the battery controller 300, thereby sequentially starting up the plurality of integrated circuits. As a result, the cell controller 200 is started. As the cell controller 200 is started up, specific initialization processing is executed and thus, the lithium ion battery device 1000 starts up.

As the specific initialization processing, the voltages at the individual lithium ion battery cells may be measured, error diagnosis may be executed, the voltage and the current at the lithium ion battery device 1000 may be measured, the temperatures of the individual battery blocks may be measured, the state of charge and the state of health of the lithium ion battery device 1000 may be determined through arithmetic operation and the allowable charge/discharge levels may be determined for the lithium ion battery device 1000 through arithmetic operation.

As the ignition key switch enters an OFF state, a stop command is output from the battery controller 300 to the cell controller 200. Upon receiving the stop command, the cell controller 200 executes specific end processing, then the power circuits in the plurality of integrated circuits stop in sequence and thus the plurality of integrated circuits are turned off in sequence, thereby turning off the cell controller 200. Once the cell controller 200 stops and communication with the cell controller 200 is disabled, the operation of the power circuit at the battery controller 300 stops, thereby stopping the operation of the plurality of electronic circuit components. Consequently, the battery controller 300 is turned off and the lithium ion battery device 1000, too, is turned off.

The specific end processing may be executed by measuring the voltages at the individual lithium ion battery cells and adjusting the levels of power stored in the individual lithium ion battery cells.

Information is exchanged between the battery controller 300 and the higher-order control device such as the vehicle controller 30 or the motor controller 23 through communication enabled via an on-vehicle local area network. Information is exchanged between the battery controller 300 and the cell controller 200 through LIN communication conducted in compliance with the on-vehicle local area network communication.

A positive pole terminal of the high potential-side battery block 100a and the DC positive pole-side external terminal of the inverter device 20 are electrically connected via a positive pole-side power cable 610. A negative pole terminal of the low potential-side battery block 100b and the DC negative pole-side external terminal of the inverter device 20 are electrically connected via a negative pole-side power cable 620.

A junction box 400 is disposed on the power cable 600. A relay mechanism constituted with a main relay 410 and a pre-charge circuit 420 is housed inside the junction box 400. The relay mechanism is a switching unit that sets the battery module 100 and the inverter device 20 in an electrically continuous state or an electrically isolated state. When starting up the on-vehicle electrical system, the battery module 100 and the inverter device 20 are set in the electrically continuous state, whereas when the on-vehicle electrical system is turned off or in the event of an error, the battery module 100 and the inverter device 20 are set in the electrically isolated state. By controlling the electrical connection between the lithium ion battery device 1000 and the inverter device 20 via the relay mechanism as described above, a high level of safety is assured for the on-vehicle electrical system.

Drive of the relay mechanism is controlled by the motor controller 23. Upon receiving a startup complete notice indicating that the lithium ion battery device 1000 has been fully started up from the battery controller 300 as the on-vehicle electrical system is started up, the motor controller 23 outputs a continuity command signal to the relay mechanism, thereby driving the relay mechanism. In addition, when the on-vehicle electrical system is turned off or when an error has occurred in the on-vehicle electrical system, the motor controller 23 outputs a cutoff command signal to the relay mechanism based upon an OFF signal output from the ignition key switch or an error signal received from the vehicle controller 30 so as to drive the relay mechanism.

The main relay 410 is constituted with a positive pole-side main relay 411 and a negative pole-side main relay 412. The positive pole-side main relay 411, disposed on the positive pole-side power cable 610, controls the electrical connection between the positive pole-side of the lithium ion battery device 1000 and the positive pole-side of the inverter device 20. The negative pole-side main relay 412, disposed on the negative pole-side power cable 620, controls the electrical connection between the negative pole-side of the lithium ion battery device 1000 and the negative pole-side of the inverter device 20.

The pre-charge circuit 420 is a serial circuit formed by electrically connecting a pre-charge relay 421 and a resistor 422 in series, and is electrically connected to the positive pole-side main relay 411 in parallel.

The on-vehicle electrical system is started up first by turning on the negative pole-side main relay 412 and then turning on the pre-charge relay 421. As a result, the electric current supplied from the lithium ion battery device 1000 is first limited via the resistor 422 and the current thus limited is then supplied to the smoothing capacitor 24 to charge the smoothing capacitor. After the smoothing capacitor 24 is charged to achieve a predetermined voltage, the positive pole-side main relay 411 is turned on and the pre-charge relay 421 is opened. Thus, the main current is supplied from the lithium ion battery device 1000 to the inverter device 20 via the positive pole-side main relay 411. The main current supplied at this time is equal to or less than the allowable current at the positive pole-side main relay 411 and the smoothing capacitor 24. This means that the smoothing capacitor 24 and the positive pole-side main relay 411 are protected from excessive current by ensuring that a momentary inflow of a large initial current from the lithium ion battery device 1000 to the inverter device 20, caused by the absence of any substantial electrical charge in the smoothing capacitor 24 at the time of on-vehicle electrical system startup, does not heat the smoothing capacitor 24 to cause damage or fuse the fixed contact point and the movable contact point at the positive pole-side main relay 411.

In addition, a current sensor 430 is housed inside the junction box 400. The current sensor 430 is installed so as to detect the current supplied from the lithium ion battery device 1000 to the inverter device 20. The output line of the current sensor 430 is electrically connected to the battery controller 300.

Based upon a signal output from the current sensor 430, the battery controller 300 is able to detect the current supplied from the lithium ion battery device 1000 to the inverter device 20. Current detection information indicating the detected current is provided from the battery controller 300 to the motor controller 23, the vehicle controller 30 and the like. In an alternative configuration, the current sensor 430 may be installed outside the junction box 400. The current originating from the lithium ion battery device 1000 may be detected on the side of the positive pole-side main relay 411 further toward the battery module 100 instead of on the side of the positive pole-side main relay 411 further toward the inverter device 20.

It is to be noted that a voltage sensor that detects the voltage at the lithium ion battery device 1000 may be housed inside the junction box 400. The output line of such a voltage sensor is electrically connected to the battery controller 300, as is the output line of the current sensor 430. Based upon a signal output from the voltage sensor, the battery controller 300 is able to detect the voltage at the lithium ion battery device 1000. Voltage detection information indicating the detected voltage will be provided to the motor controller 23 and the vehicle controller 30. The voltage at the lithium ion battery device 1000 may be detected on the side of the relay mechanism further toward the battery module 100 or on the side of the relay mechanism further toward the inverter device 20.

A positive pole-side capacitor 500 is electrically connected at a position between the positive pole-side power cable 610 and a casing ground (with a potential equal to that at the vehicle chassis) of the lithium ion battery device 1000. A negative pole-side capacitor 510 is electrically connected at a position between the negative pole-side power cable 620 and the casing ground (with a potential equal to that at the vehicle chassis) of the lithium ion battery device 1000. The positive pole-side capacitor 500 and the negative pole-side capacitor 510 are installed in order to prevent erroneous operation of the battery controller 300 and the cell controller 200, each forming a weak electrical system circuit, and prevent damage from a surge voltage in the integrated circuits (ICs) constituting the cell controller 200 by removing noise occurring at the inverter device 20. While the inverter device 20 itself includes a noise removal filter, the presence of the additional capacitors, i.e., the positive pole-side capacitor 500 and the negative pole-side capacitor 510, which help prevent erroneous operation of the battery controller 300 and the cell controller 200, each forming a weak electrical system circuit, and prevent damage from a surge voltage in the integrated circuits (ICs) constituting the cell controller 200 more effectively, assures a higher level of reliability with regard to the noise withstanding performance of the lithium ion battery device 1000.

It is to be noted that the on-vehicle electrical system in the embodiment uses the air inside the vehicle as the cooling medium and the lithium ion battery device 1000 and the inverter device 20 are cooled with the air in this order. For this reason, the lithium ion battery device 1000 and the inverter device 20 are housed inside a common storage case and their cooling passages are connected with each other through a duct. In addition, the drive of a fan used to feed the cooling medium into the storage case is controlled by the motor controller 23 or the vehicle controller 30 functioning as the higher-order controller relative to the motor controller 23 by monitoring the temperatures at the battery module 100 and the power module 21. If the lithium ion battery device 1000 is installed separately, the drive of the fan that feeds the cooling medium will be controlled by the battery controller 300 by monitoring the temperature at the battery module 100.

In reference to FIGS. 1~11 and 13, the structure adopted in the lithium ion battery device 1000 is described.

The lithium ion battery device 1000 is constituted with two primary units, i.e., the battery module 100 and the control device 900.

The structure of the battery module 100 is first described.

As explained earlier, the battery module 100 in the embodiment is made up with the high potential-side battery block 100a and the low potential-side battery block 100b, which are electrically connected with each other in series. The high potential-side battery block 100a and the low potential-side battery block 100b are hexahedral blocks structured identically to each other. Each of the battery blocks 100a and 100b has two side surfaces which are disposed on the shorter side of the rectangular parallelepiped shape to face opposite each other and to incline parallel to each other. The battery blocks 100a and 100b are disposed side by side on a common module base 101, with their longer sides arranged adjacent to each other, and are fixed onto the module base via locking means such as bolts. The module base 101 is a flat rectangular plate with the measurement thereof taken along the shorter span direction greater than (at least twice as long as) the measurement of each battery block taken along the shorter span direction. It is constituted with a rigid metal plate (e.g., an iron plate) having a small wall thickness and is fixed onto the vehicle 3000.

A support member 102 locks the high potential-side battery block 100a and the low potential-side battery block 100b at their ends located on one side of the lengthwise direction. A support member 103 locks the high potential-side battery block 100a and the low potential-side battery block 100b at their ends located on the other side of the lengthwise direction. The support members 102 and 103 are plate members constituted of a very rigid metal.

The primary components of the high potential-side battery block 100a are a casing 110 (may be referred to as a housing or a package) and an assembled battery 120. The assembled battery 120 is housed and held inside the casing 110.

The casing 110 is a substantially hexahedral block casing. The two side surfaces of the casing 110 are disposed on the shorter side of the rectangular parallelepiped shape to face opposite each other and to incline parallel to each other. It is structured as a combination of six members, i.e., an intake flow passage forming plate 111, an outlet flow passage forming plate constituted with the module base 101, an intake-side guide plate 112, an outlet-side guide plate 113 and two side plates 130 and 131. The internal space at the casing 110 forms a storage chamber where the assembled battery 120 is housed and also forms a cooling passage to be detailed later, through which the cooling medium (cooling air) used to cool the assembled battery 120 flows.

It is to be noted that while the module base 101 also functions as the outlet flow passage forming plate in the embodiment, the casing may include a separate outlet flow passage forming plate independent of the module base 101.

The intake flow passage forming plate 111 is a rectangular flat plate constituting the upper surface of the casing 110. The outlet flow passage forming plate (module base 101) is a flat plate constituting the bottom surface of the casing 110. The intake flow passage forming plate 111 and the outlet flow passage forming plate (module base 101) are disposed at positions offset relative to each other along the lengthwise direction. Thus, the positions of the ends of the intake flow passage forming plate 111 and the outlet flow passage forming plate (module base 101) along their longer sides are offset along the lengthwise direction. The intake flow passage forming plate 111 and the outlet flow passage forming plate (module base 101) are each constituted with a rigid metal plate having a small wall thickness.

It is to be noted that an outlet flow passage forming plate provided as a member independent of the module base 101 should be constituted with a rectangular flat plate assuming a size matching that of the intake flow passage forming plate 111.

The intake-side guide plate 112 is a plate member constituting one of the shorter side surfaces of the casing 110 facing opposite each other. The outlet-side guide plate 113 is a plate member constituting the other shorter side surface facing opposite the first side surface at the casing 110. The intake-side guide plate 112 and the outlet-side guide plate 113 are each constituted with a rigid metal plate having a small wall thickness.

As explained earlier, the positions of the ends of the intake flow passage forming plate 111 and the outlet flow passage forming plate (module base 101) along their longer sides are offset relative to each other along the lengthwise direction. Thus, the intake-side guide plate 112 is constituted with a flat tilted plate ranging at an angle from the end of the outlet flow passage forming plate located on one side along the lengthwise direction toward the end of the intake flow passage forming plate 111 located on the same side along the lengthwise direction. The outlet-side guide plate 113 is constituted with a flat tilted plate ranging at an angle from the end of the intake flow passage forming plate 111 located on the other side along the lengthwise direction toward the end of the outlet flow passage forming plate located on the same side along the lengthwise direction.

The side plates 130 and 131 are flat plate members constituting the two side surfaces of the casing 110 disposed on the longer side of the casing 110 and facing opposite each other. The flat plate members are moldings, each formed by casting a resin assuring reliable electrical insulation, such as PBT. The side plates 130 and 131 assume a wall thickness greater than those of the intake flow passage forming plate 111, the outlet flow passage forming plate (module base 101), the intake-side guide plate 112 and the outlet-side guide plate 113.

A cooling medium intake 114, constituting an intake port through which the cooling air used as the cooling medium is taken into the casing 110, is formed between the end of the intake flow passage forming plate 111 located on one side along the lengthwise direction and the end of the intake-side guide plate 112 located toward the intake flow passage forming plate 111. A cooling medium intake duct 116 through which the cooling air is guided to the cooling medium intake 114 is disposed at the cooling medium intake 114. A cooling medium outlet 115, constituting an outlet port through which the cooling air in the casing 110 is let out, is formed between the end of the outlet flow passage forming plate (module base 101) located on the other side along the lengthwise direction and the end of the outlet-side guide plate 113 located toward the outlet flow passage forming plate (module base 101). A cooling medium outlet duct 117 through which the cooling air is guided to the cooling medium outlet 115 is disposed at the cooling medium outlet 115.

The positions of the cooling medium intake 114 and the cooling medium outlet 115 are offset relative to each other along the height-wise direction (the direction along which the intake flow passage forming plate 111 and the outlet flow passage forming plate (module base 101) face opposite each other). Namely, the cooling medium intake 114 is located further toward the intake flow passage forming plate 111, whereas the cooling medium outlet 115 is located further toward the outlet flow passage forming plate (module base 101). They are thus located so as to allow the assembled battery 120 to be disposed at a specific position and the cooling air to be distributed through a specific flow to cool the assembled battery 120, as described later.

The intake flow passage forming plate 111, the intake-side guide plate 112, the outlet-side guide plate 113, the cooling medium intake 114, the cooling medium outlet 115, the cooling medium intake duct 116 and the cooling medium outlet duct 117 are formed as an integrated unit. While these members may be formed as members separate from one another, it is more desirable to form them as an integrated unit, in order to assure easier assembly of the battery block. If the outlet flow passage forming plate is provided as a member independent of the module base 101, it is desirable to form the intake flow passage forming plate 111, the outlet-side guide plate 113, the cooling medium intake 114 and the cooling medium intake duct 116 as an integrated unit and form the outlet flow passage forming plate, the intake-side guide plate 112, the cooling medium outlet 115 and the cooling medium outlet duct 117 as an integrated unit in order to assure easier assembly of the battery block.

The intake flow passage forming plate 111, the outlet flow passage forming plate (module base 101), the intake-side guide plate 112, the outlet-side guide plate 113, the cooling medium intake 114 and the cooling medium outlet 115 and the side plates 130 and 131 are combined together via locking means such as screws, bolts or rivets. A seal member (not shown) is disposed over each area where a given member is made to join another member, so as to assure a high level of airtightness inside the casing 110 and allow the cooling medium having been drawn into the casing 110 via the cooling medium intake 114 to be let out through the cooling medium outlet 115 without leakage.

The terms "lengthwise direction" and "shorter span direction", having already been used in an earlier description, are defined as follows. The lengthwise direction is defined as the direction along which the casing 110 assumes the greatest length or the direction ranging from the cooling medium intake 114 toward the cooling medium outlet 115. The shorter span direction is defined as the direction along which the two side surfaces (the intake-side guide plate 112 and the outlet-side guide plate 113), other than the two side surfaces (the two side plates 130 and 131 disposed along the lengthwise direction), of the casing 110 are disposed, the direction along which the central axes of the lithium ion battery cells 140 extend (the direction connecting the two electrodes, i.e., the positive pole terminal and the negative pole terminal) or the direction in which a conductive member electrically connecting two lithium ion battery cells 140 faces the two lithium ion battery cells 140. The terms defined as described above are to be used in the subsequent description as well.

In addition, the term "height-wise direction" is defined in reference to the embodiment as the direction in which the intake flow passage forming plate 111 faces the outlet flow passage forming plate (module base 101) or the direction along which the outlet flow passage forming plate (module base 101), the outlet side cooling passage, the assembled battery 120, the intake-side cooling passage and the intake flow passage forming plate are layered one on top of another, irrespective of the direction along which the battery module 100 is installed. The term thus defined is used in the subsequent description as well.

The assembled battery 120 is structured as an aggregation (group) of a plurality of lithium ion battery cells 140. The lithium ion battery cells 140 are housed in neat alignment inside the storage chamber formed within the casing 110.

They are also held between the side plates 130 and 131 in the shorter span direction and are electrically connected in series via a plurality of conductor members 150 referred to as bus bars.

Figure 1:
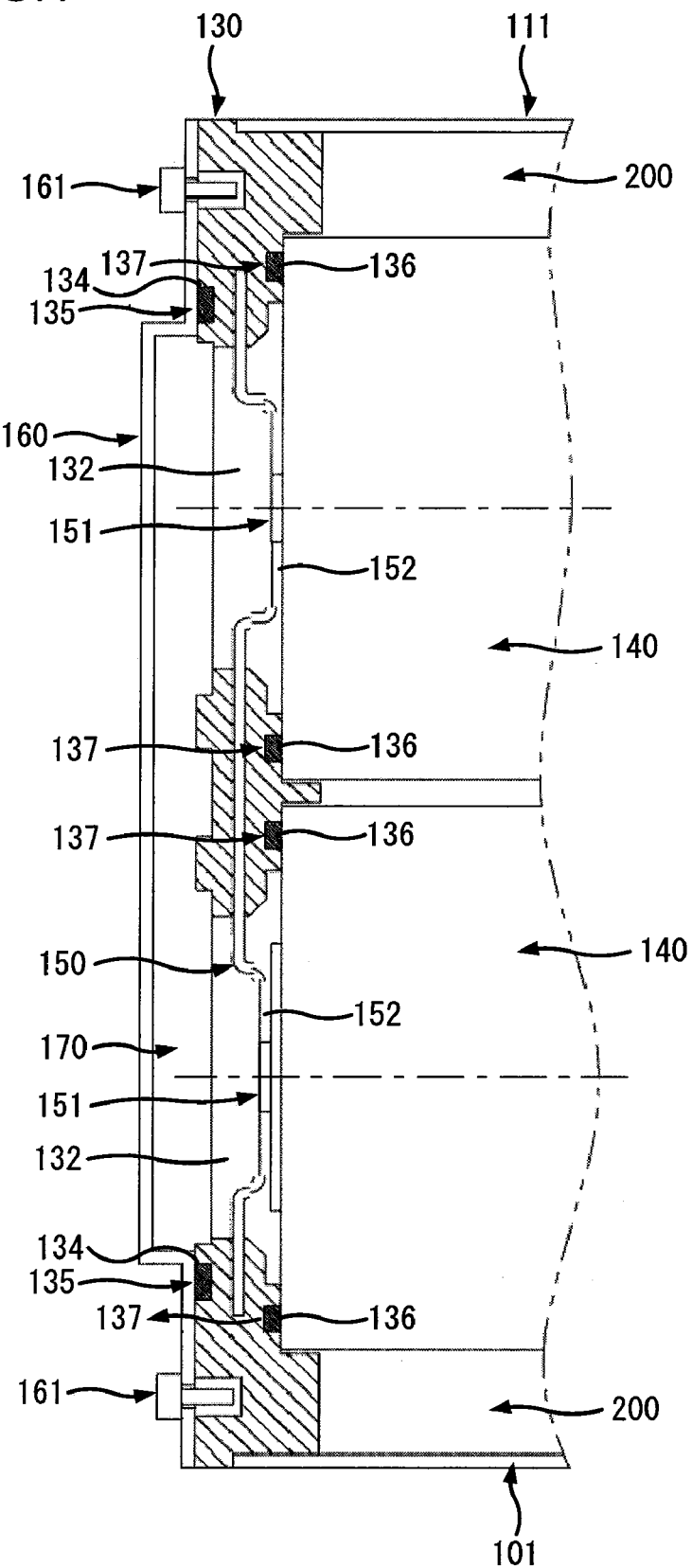
FIG. 1 is a partial sectional view of the structure adopted on the lithium ion battery cell side and the opposite side, between which one of the side plates in the battery module constituting the lithium ion battery device achieved in a first embodiment of the present invention is present.
Figure 2:
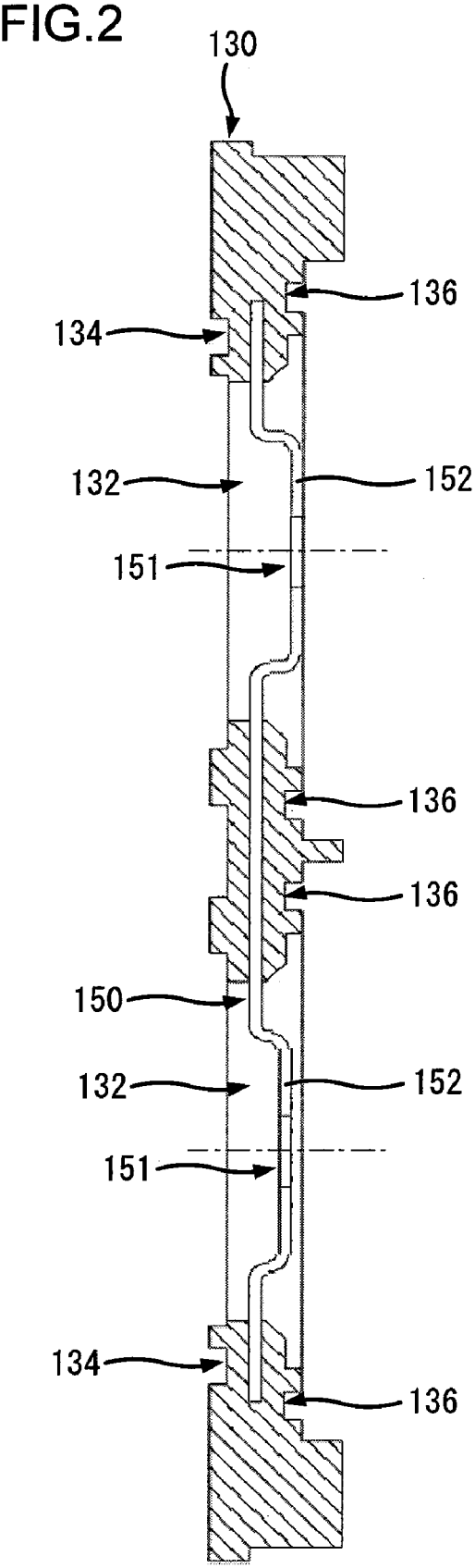
FIG. 2 is a sectional view of the structure adopted in the side plate shown in FIG. 1.
Figure 3:
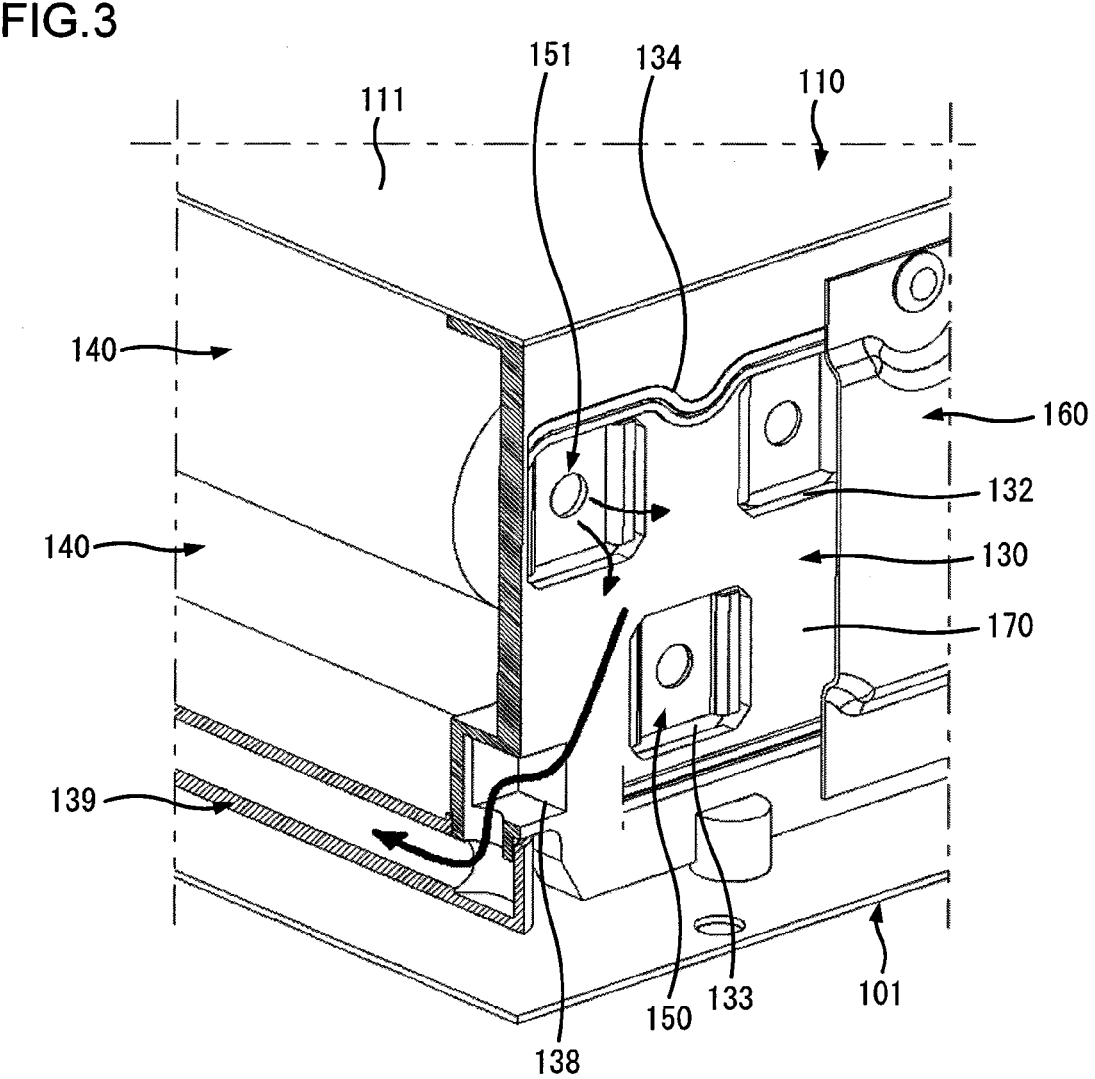
FIG. 3 is a partial sectional view showing in an enlarged perspective the structure adopted in the gas discharge mechanism installed at one end, along the lengthwise direction, of the battery module constituting the lithium ion battery device achieved in the first embodiment of the present invention.
Figure 4:
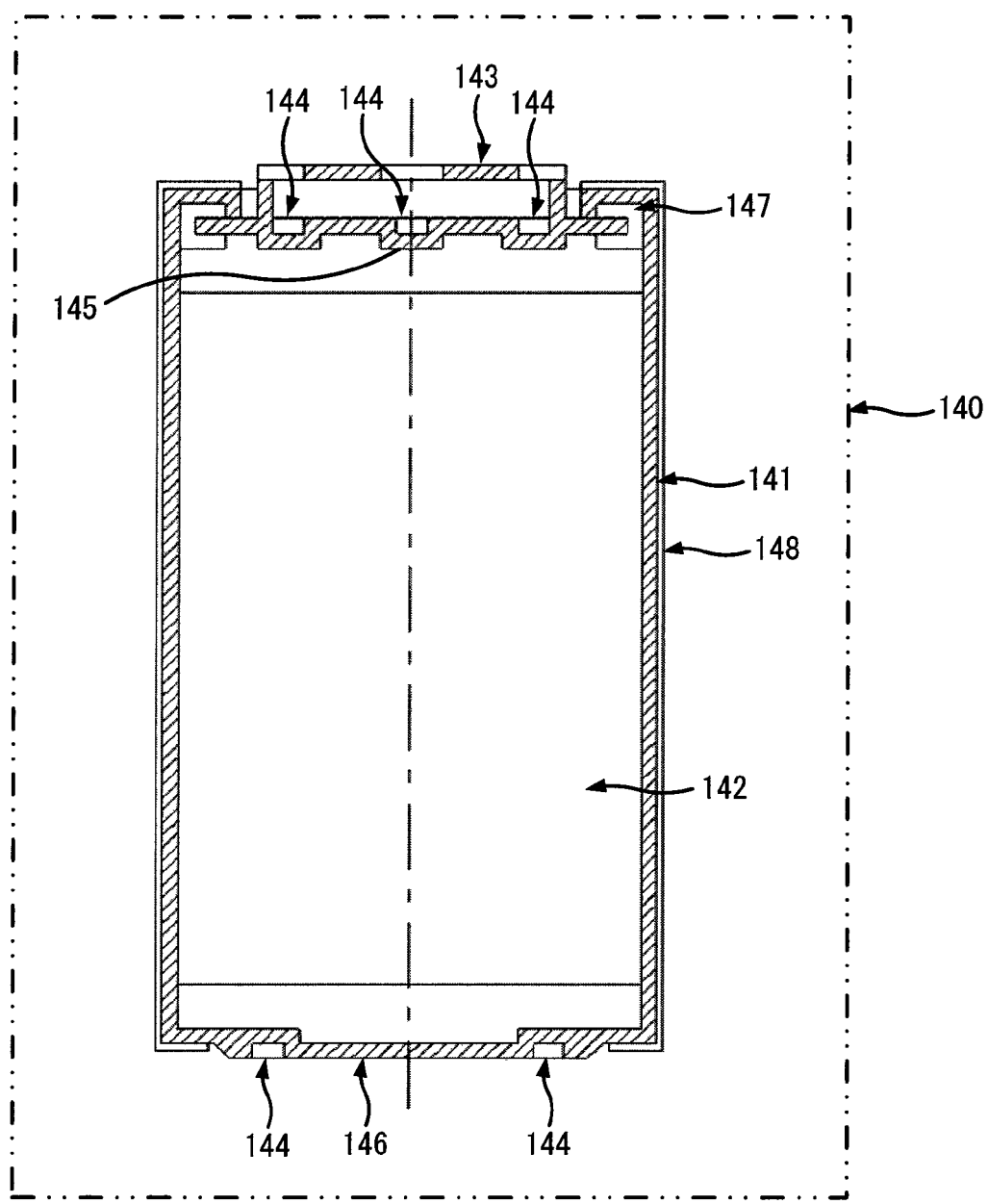
FIG. 4 is a sectional view of the structure adopted in the lithium ion battery cells built into the battery module constituting the lithium ion battery device achieved in the first embodiment of the present invention.
Figure 5:
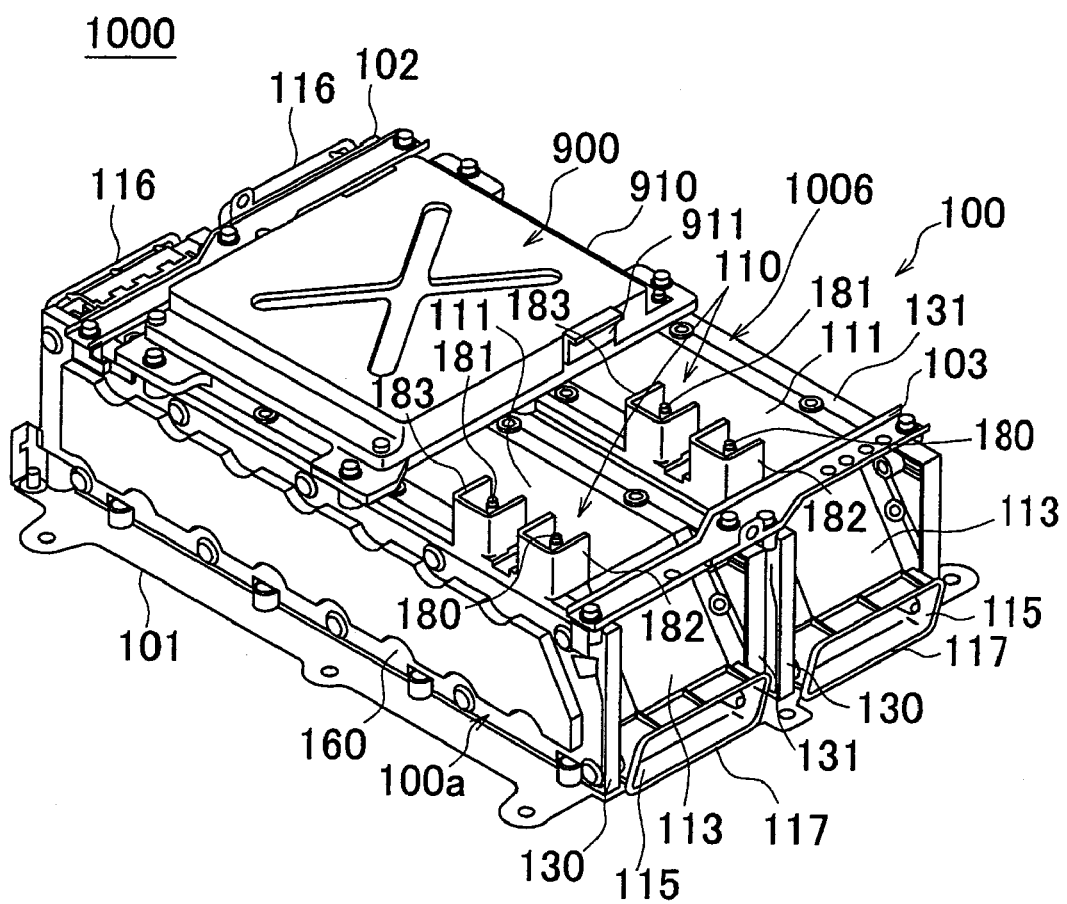
FIG. 5 is a perspective of the overall external structure assumed in the lithium ion battery device achieved in the first embodiment of the present invention.
Figure 6:
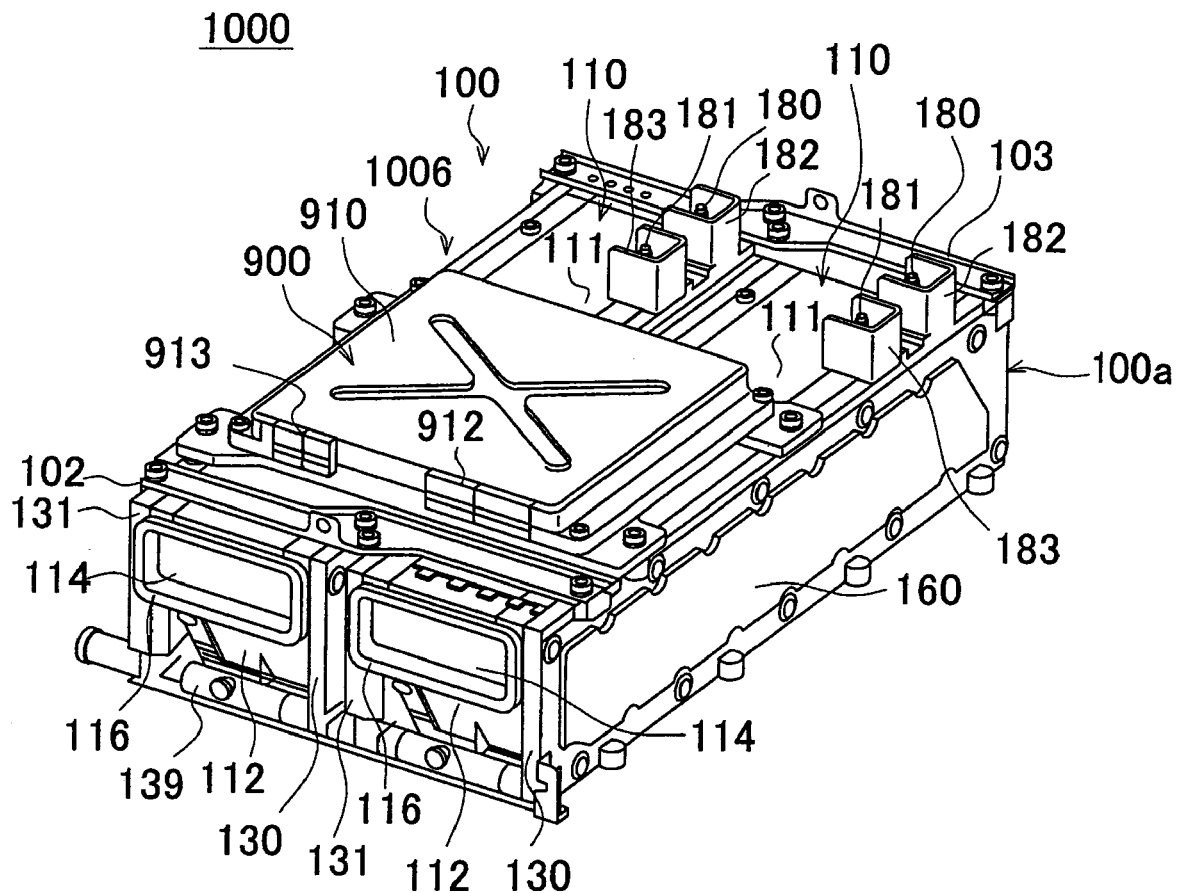
FIG. 6 is a perspective taken from the cooling medium intake-side in FIG. 5.
Figure 7:
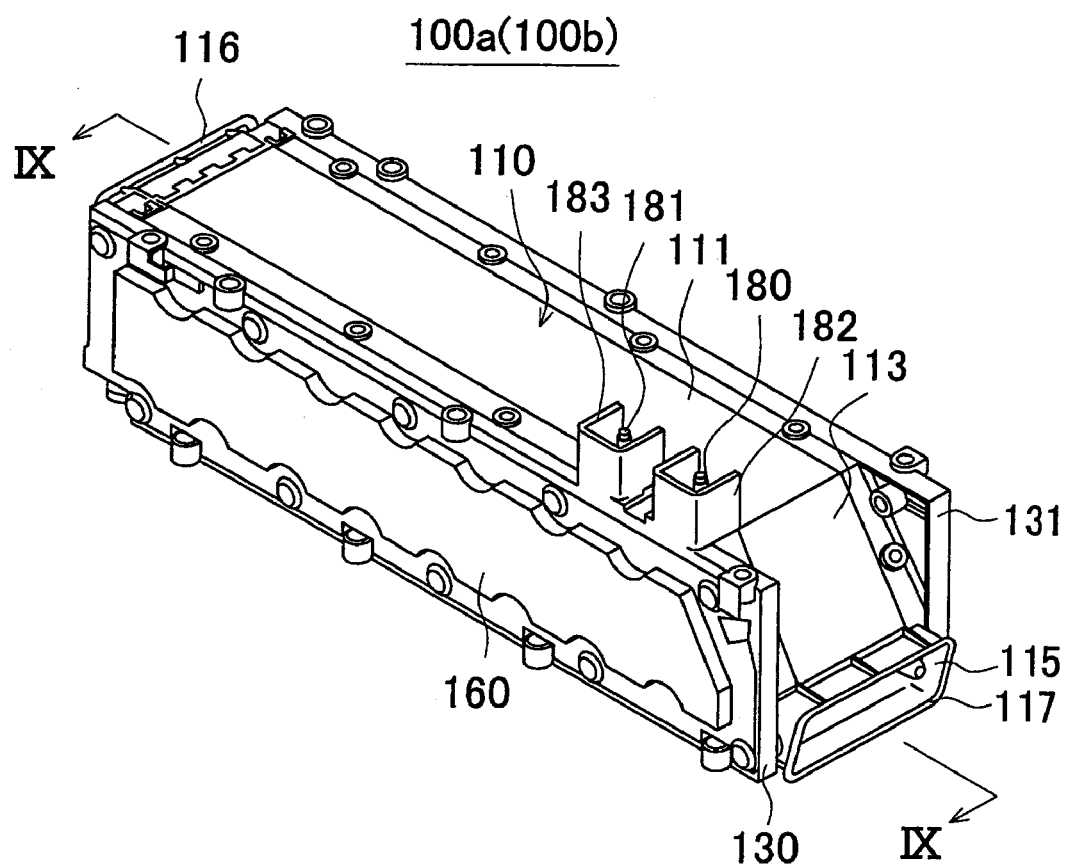
FIG. 7 is a perspective of the overall external structure assumed in one of the battery blocks in the battery module constituting the lithium ion battery device shown in FIG. 5.
Figure 8:
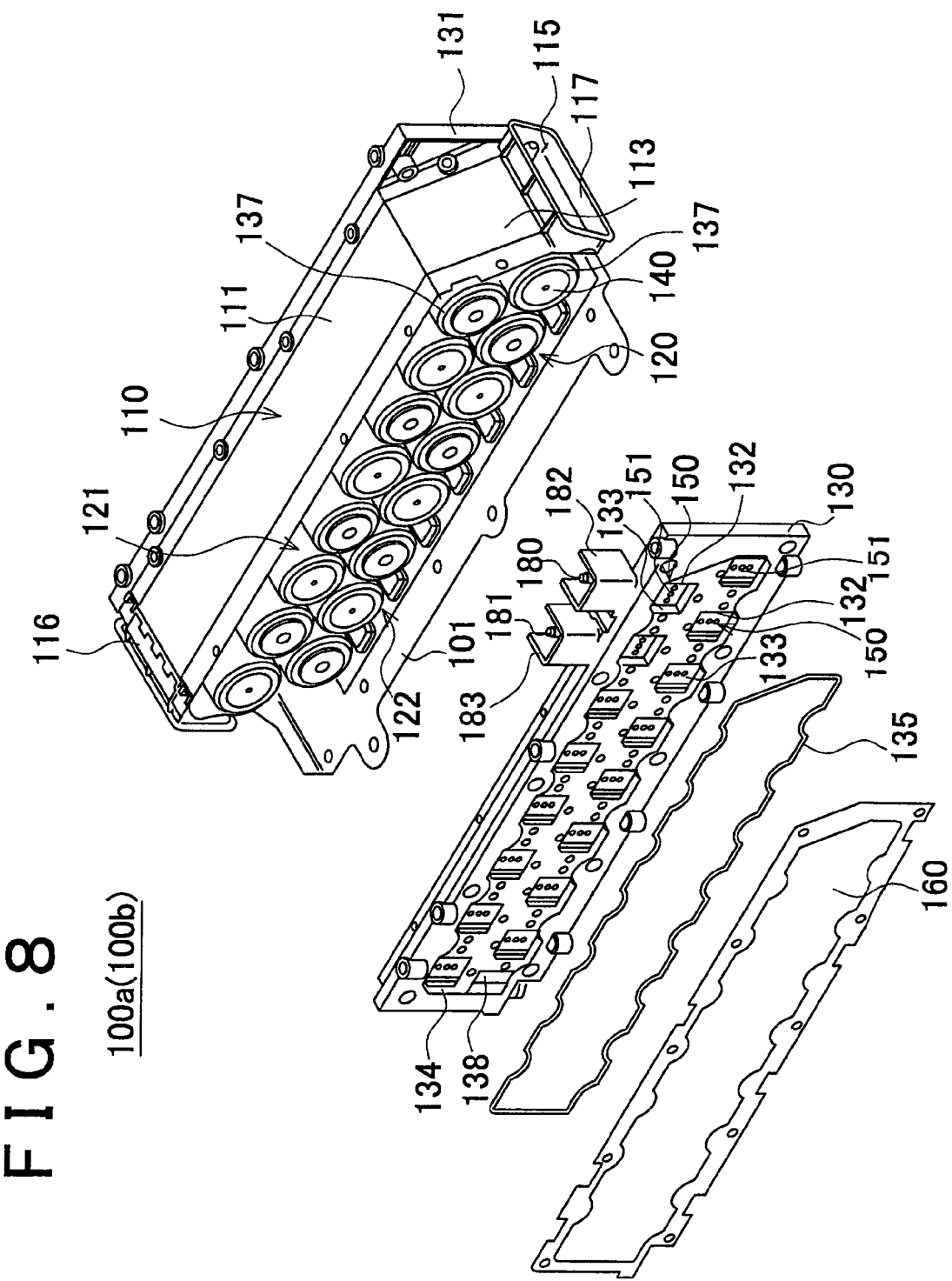
FIG. 8 is an exploded perspective of the structure shown in FIG. 7.

As shown in FIG. 4, the lithium ion battery cells 140 each assume the shape of a circular column, which is a sealed canister constituting a battery case 141 filled with an electrolyte and housing other components such as a battery element (battery element portion) 142 and a safety valve 145, with an open end of the battery case 141 closed off with a battery lid 143. The battery element 142 is a coil formed by layering a positive pole plate and the negative pole plate one on top of the other via a separator constituted of a porous insulating material and winding the layered assembly in a coil. The battery case 141 is a cylindrical metal canister with a solid bottom at one side and an open end at the other side. The battery lid 143, which is a round seal member constituted of metal, is fixed through caulking to the open end of the battery case 141 via an insulating member 147 together with other components such as the safety valve 145. The positive pole-side of the battery element 142 is electrically connected to the battery lid 143. Thus, the battery lid 143 forms a positive pole-side terminal assuming a potential equal to that on the positive pole-side of the battery element 142. The negative pole-side of the battery element 142 is electrically connected to a bottom portion 146 of the battery case 141. Thus, the bottom portion 146 of the battery case 141 forms a negative pole-side terminal assuming a potential equal to the potential on the negative pole-side of the battery element 142. The insulating member 147 electrically insulates the battery lid 143 forming the positive pole from the battery case 141 forming the negative pole. A tube 148 constituted of insulating material covers the outer circumferential surface of the battery case 141 so as to assure electrical insulation.

The safety valve 145 is a valve that breaks and opens whenever the internal pressure in the battery case 141 reaches a predetermined level due to an abnormality such as an overcharge. It is constituted with a member that includes cleaving grooves 144. The safety valve fulfills two functions. Namely, as the safety valve 145 breaks, it functions as a fuse mechanism that cuts off the electrical connection between the battery lid 143 and the positive pole-side of the battery element 142. In addition, as it breaks, it functions as a pressure-reducing mechanism that lets out gas having been generated inside the battery case 141, i.e., a vapor of carbon oxide gas (emitted matter) containing the electrolyte, to the outside of the battery case 141 by opening the battery case 141. Through the safety valve 145, a high level of safety is assured in the lithium ion battery cell 140 even in the event of an abnormality such as an overcharge. In addition, cleaving grooves 144 are also formed at the bottom portion 146 of the battery case 141 so as to break whenever the internal pressure at the battery case 141 reaches a predetermined level due to an abnormality such as an overcharge. Thus, the gas generated inside the battery case 141 can be released through the negative pole terminal side as well.

The nominal output voltage of the lithium ion battery cells 140 is 3.0 to 4.2 V, whereas the mean nominal output voltage is 3.6 V.

The assembled battery 120 in the embodiment is formed by disposing sixteen lithium ion battery cells 140 assuming a cylindrical shape as described earlier in neat alignment inside the casing 110. More specifically, the assembled battery 120 is formed by laying down the sixteen lithium ion battery cells 140 so that their central axes extend along the shorter span direction, forming a first battery cell row 121 and a second battery cell row 122 each made up of eight lithium ion battery cells 140. The first battery cell row 121 and the second battery cell row 122 are arranged so that their center lines range side-by-side and parallel to one another along the lengthwise direction. The first battery cell row 121 and the second battery cell row 122 are layered one on top of the other along the height-wise direction (by stacking them straight or layering them with an offset). Namely, the assembled battery 120 includes battery cells arrayed over two stages or two layers along the height-wise direction and eight cells along the lengthwise direction.

The first battery cell row 121 and the second battery cell row 122 are offset relative to each other along the lengthwise direction. Namely, the first battery cell row 121, which is set further toward the intake flow passage forming plate 111 than the second battery cell row 122, is thus offset further toward the cooling medium intake 114 than the second battery cell row 122. The second battery cell row 122, which is set further toward the outlet flow passage forming plate than the first battery cell row 121, is thus offset further toward the cooling medium outlet 115 than the first battery cell row 121. In the embodiment, the first battery cell row 121 and the second battery cell row 122 are offset relative to each other along the lengthwise direction so that the position assumed along the lengthwise direction by the central axis of the lithium ion battery cell 140 in the first battery cell row 121 taking up the position closest to the cooling medium outlet 115 is set at the middle point between the central axis of the lithium ion battery cell 140 in the second battery cell row 122 taking up the position closest to the cooling medium outlet 115 and the central axis of the adjacent lithium ion battery cell 140 in the second battery cell row.

The lithium ion battery cells 140 in the first battery cell row 121 are set side-by-side so that the terminals at alternate battery cells assume opposite orientations. Namely, the terminals at the lithium ion battery cells 140 facing toward the side plate 130 form an alternate pattern of a "negative pole terminal-positive pole terminal-negative pole terminal . . . positive pole terminal" starting from the side where the cooling medium intake 114 is present and advancing toward the cooling medium outlet 115. Likewise, the lithium ion battery cells 140 in the second battery cell row 122 are set side-by-side so that the terminals at alternate battery cells assume opposite orientations. Namely, the terminals at the lithium ion battery cells 140 facing toward the side plate 130 form an alternate pattern of a "positive pole terminal-negative pole terminal-positive pole terminal . . . negative pole terminal" starting from the side where the cooling medium intake 114 is present and advancing toward the cooling medium outlet 115. In addition, the pattern formed with the terminals at the lithium ion battery cells 140 in the first battery cell row 121, starting on the side where the cooling medium intake 114 is present and advancing toward the cooling medium outlet 115, is different from the pattern formed with the terminals at the lithium ion battery cells 140 in the second battery cell row 122, starting on the side where the cooling medium intake 114 is present and advancing toward the cooling medium outlet 115.

As described above, the first battery cell row 121 and the second battery cell row 122 are offset along the lengthwise direction in the embodiment, so as to minimize the measurement of the assembled battery 120 taken along the height-wise direction and thus reduce the size of the high potential-side battery block 110a along the height-wise direction.

The conductive members 150 are each constituted with a copper plate member connected through welding to the positive pole terminal of a lithium ion battery cell 140 and the negative pole terminal of another lithium ion battery cell 140, adjacent to each other among the lithium ion battery cells 140 electrically connected in the specific pattern as described earlier, so as to electrically connect the two adjacent lithium ion battery cells 140. The conductive members are embedded in the side plates 130 and 131 so as to expose the welding areas over which they are welded with the adjacent lithium ion battery cells 140. In other words, the plurality of conductive members 150 are formed as integrated parts of the side plates 130 and 131. The conductive members 150 may be constituted of another metal such as iron. The welding areas where the conductive members 150 are welded with the lithium ion battery cells 140 form projecting surfaces that project further toward the lithium ion battery cells 140 compared to the other areas (the molded areas). Circular through holes 151 ranging through the shorter span direction are formed at the centers of the projecting surfaces. Gas emitted from the lithium ion battery cells 140 is allowed to pass through the through holes 151.

Sixteen through holes 132 are formed at each of the side plates 130 and 131 so as to range through the wall of the side plate along the shorter span direction. The sixteen through holes 132 are formed each in correspondence to the position of one of the sixteen lithium ion battery cells 140 arrayed as described earlier so that each hole opening is set in correspondence to the position of the electrode at one of the lithium ion battery cells 140. The sixteen through holes 132 are formed so that their openings further toward the lithium ion battery cells 140 assume a circular shape and their openings on the side opposite from the lithium ion battery cells 140 assume a quadrangular shape. The opening areas of the through holes on both sides are smaller than the size of the terminal surfaces at the lithium ion battery cells 140 present along the axial direction (the shorter span direction). Inside each of the sixteen through holes 132, a welding area (projecting surface) 152 over which a conductive member 150 is welded with the corresponding lithium ion battery cell 140 is positioned so as to disallow a clear passage through the shorter span direction. As a result, the sixteen through holes 132 are mostly blocked by the conductive members 150. A clearance 133 is formed between the wall surface of each through hole 132 and the conductive member 150 therein. The clearance 133 is formed so as to communicate between the space beyond the conductive member 150 further toward the lithium ion battery cell 140 and the space located on the opposite side from the lithium ion battery cell side and thus, the gas emitted from the lithium ion battery cell 140 can be released into the space located on the side opposite from the lithium ion battery cell side.

The sixteen lithium ion battery cells 140 are held between the side plates 130 and 131 in the following manner. Namely, the terminal surfaces located on the side toward the side plate 130 (the surfaces at one end of the cells toward the side plate 130 in the central axis direction (in the shorter span direction)) block the openings at the sixteen through holes 132 in the side plate 130 from the side plate 131 side. And, the terminal surfaces located on the side toward the side plate 131 (the surfaces at the other end of the cells toward the side plate 131 in the central axis direction (along the shorter span direction)) block the openings at the sixteen through holes 132 in the side plate 131 from the side plate 130 side.

The welding areas 152 of the conductive members 150 located at the side plate 130 are welded to the terminal surfaces of the corresponding lithium ion battery cells 140 present on the side toward the side plate 130, through TIG welding or the like performed from the side of the side plate 130 opposite from the side where the side plate 131 is located. The welding areas 152 of the conductive members 150 located at the side plate 131 are welded to the terminal surfaces of the corresponding lithium ion battery cells 140 present on the side toward the side plate 131, through TIG welding or the like performed from the side of the side plate 131 opposite from the side where the side plate 130 is located. As the conductive members 150 are connected as described above, the sixteen lithium ion battery cells 140 become electrically connected in series.

A shield member 160 referred to as a side cover is locked onto the side of the side plate 130, opposite from the side on which the side plate 131 is located, via locking means 161 such as bolts or rivets. The shield member 160 shields the side of the side plate 130 opposite from the side where the side plate 131 is located, so as to form a space on the side of the side plate 130 opposite from the side where the side plate 131 is located. Likewise, a shield member 160 is locked onto the side of the side plate 131 opposite from the side where the side plate 130 is located via a locking means 161 such as bolts or rivets, so as to form a space on the side of the side plate 131 opposite from the side where the side plate 130 is located. The shield plates 160 are each constituted with a flat plate formed by press-machining a metal plate such as an iron plate or an aluminum plate or a flat plate formed by molding a resin such as PBT. The shield plates are formed so as to assume contours substantially identical to those of the side surfaces of the side plates 130 and 131 with areas surrounding the positions facing the through holes 132 uniformly recessed or protruded toward the side opposite from the sides where the side plates 130 and 131 are present. The areas of the side plates 130 and 131 facing opposite the recessed portions of the shield plates 160, too, are uniformly recessed toward the lithium ion battery cells 140.

The space formed between shield member 160 and the side surface of the side plate 130 (where their recessed portions are present) and the space formed between the shield member 160 and the side surface of the side plate 131 (where their recessed portions are present) are each isolated with high levels of airtightness and water-tightness from the cooling passage adjacent thereto along the shorter span direction and the spaces each form a gas release chamber (or a gas release passage) 170 into which the gaseous vapor emitted from the lithium ion battery cells 140 is released separately from the cooling medium distributed through the cooling passage. The gas release chambers 170 are formed as chambers enclosed by the shield members 160 and the side plates 130 and 131 with the through holes 132 closed off by the terminal surfaces of the lithium ion battery cells 140. Thus, the terminal surfaces of the lithium ion battery cells 140 are directly exposed in the gas release chambers 170, so as to allow the gas emitted through the terminal surfaces of the lithium ion battery cells 140 to be released directly into the gas release chambers through the through holes 151 at the conductive members 150 and the clearances 133.

In the embodiment, the gas emitted from the lithium ion battery cells 140 is processed separately from the cooling medium flowing through the cooling passages, guiding the gas to the gas release chambers 170 isolated from the cooling passages formed inside the casing 110. Thus, the gas emitted from the lithium ion battery cells 140, is not released into the cabin together with the cooling medium and the driver and passengers are spared any discomfort that may otherwise be caused by the gas emitted from the lithium ion battery cells 140.

The side plates 130 and 131 includes a gas discharge passage 138 through which the gas (a gas vapor containing a liquid such as the electrolyte) having been released into the corresponding gas release chamber 170 is discharged to the outside of the battery block. In order to ensure that the liquid such as the electrolyte contained in the gas is discharged efficiently, the gas discharge passage 138 is formed to open over a lower area of the side plates 130 and 131. More specifically, it is formed so as to open at an end of the recessed portions of the side plates 130 and 131 located on one side along the lengthwise direction at the lower end (toward the module-base 101) of the recessed portions along the heightwise direction. The front end of the gas discharge passage 138 forms a pipe to which a gas discharge pipe 139 that guides the gas through the gas discharge passage 138 to the outside, is connected.

Figure 13:
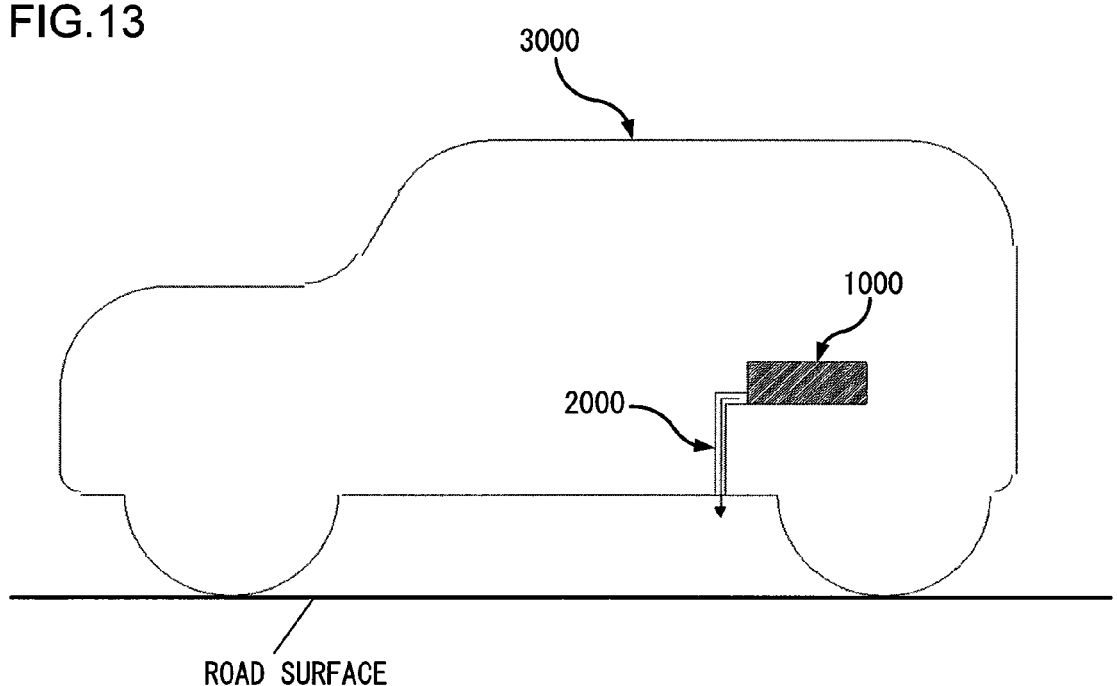
FIG. 13 is a plan view of the structure adopted in a vehicle equipped with the lithium ion battery device shown in FIG. 5.

As shown in FIG. 13, a piping 2000 extending downward from the installation location of the lithium ion battery device 1000 toward the surface of the road upon which the vehicle 3000 is traveling, is installed in the vehicle 3000. The gas discharge pipe 139 is connected to the piping 2000. Thus, the gas emitted through the terminal surfaces of the lithium ion battery cells 140, which contains liquid such as the electrolyte, is first released into the gas release chambers 170 and then is led to the outside of the vehicle by traveling through the openings of the gas discharge passages 138, the gas discharge passages 138, the gas discharge pipes 139 and the piping 2000 in this order.

In the embodiment, the gas containing a liquid such as the electrolyte, having originated in the lithium ion battery cells 140 and released into the gas release chambers 170, is discharged to the outside via the gas discharge passages 138 formed at the lower ends of the recessed portions of the side plates 130 and 131 in the height-wise direction. As a result, the liquid such as the electrolyte contained in the gas is not allowed to collect in the gas release chambers 170 and is instead discharged to the outside of the vehicle.

At the side plate 130, a single groove 134 running along the outer edge of the side plate 130 is formed at the wall surface located on the side opposite from the side toward the side plate 131, so as to surround the openings of the sixteen through holes 132 on the side opposite from the side toward the side plate 131. Likewise, a single groove 134 is formed at the wall surface of the side plate 131 located on the side opposite from the side toward the side plate 130. A ring-shaped elastic seal member 135 (e.g., a rubber O-ring) is fitted in each groove 134. As an alternative, a liquid gasket may be used as the seal member 135. The area of the side plate 130 further inward relative to the groove 134 formed at the wall surface of the side plate 130 on the side opposite from the side toward the side plate 131 and the area of the side plate 131 further inward relative to the groove 134 formed at the wall surface of the side plate 131 located on the side opposite from the side further toward the side plate 130, i.e., the areas facing opposite the recessed portions of the shield members 160, are all uniformly recessed toward the lithium ion battery cells 140.

Sixteen grooves 136, each running along the edge of the opening of one of the sixteen through holes 132 on the side toward the side wall 131, are formed so as to surround the openings of the through holes at the wall surface of the side plate 130 located on the side toward the side plate 131. Likewise, sixteen grooves 136 are formed at the wall surface of the side plate 131 located on the side toward the side plate 130. A ring-shaped elastic seal member 137 (e.g., a rubber O-ring) is fitted inside each groove 136. The seal member 136 may be constituted with a liquid gasket, instead.

In the embodiment, the spaces formed between the side plate 130 and the shield member 160 and between the side plate 131 and the shield member 160 are sealed with the seal members 135 and the spaces formed between the side plate 130 and the lithium ion battery cells 140 and between the side plate 131 and the lithium ion battery cells 140 are sealed with the seal members 137. Thus, even higher levels of airtightness and water-tightness are assured between the gas release chambers 170 and the outside and between the gas release chambers 170 and the cooling passages.

A DC positive pole-side input/output terminal 180 electrically connected to the positive pole-side of the assembled battery 120 and a negative pole-side input/output terminal 181 electrically connected to the negative pole-side of the assembled battery 120 are disposed side by side along the lengthwise direction over the outer edge surface of the side plate 130 over an area located toward the upper end along the height-wise direction (toward the intake flow passage forming plate 111) and also toward the other end along the lengthwise direction (toward the cooling medium outlet 115). A terminal of the positive pole-side power cable 610 is connected to the positive pole-side input/output terminal 180. A terminal of a cable electrically connected to one end of the SD switch 700 is connected to the negative pole-side input/output terminal 181. A terminal of a cable electrically connected to another end of the SD switch 700 is connected to the positive pole-side input/output terminal at the low potential-side battery block 110b. A terminal of the negative pole-side power cable 620 is connected to the negative pole-side input/output terminal 181 at the low potential-side battery block 110b.

The positive pole-side input/output terminal 180 and the negative pole-side input/output terminal 181 are surrounded on three sides by surrounding members 182 and 183 respectively. The terminals of the corresponding cables are connected to the positive pole-side input/output terminal 180 and the negative pole-side input output terminal 181 through openings at the surrounding members 182 and 183 located toward the side plate 131. The surrounding members 182 and 183 are moldings formed as integrated parts of the side plate 130 by using the electrically insulating resin constituting the side plate 130 and are formed so as to range upright from the outer edge surface of the side plate 130 along the height-wise direction.

An intake-side passage 190 is formed between the intake flow passage forming plate 111 and the first battery cell row 121. An outlet-side passage 191 is formed between the outlet flow passage forming plate (module base 101) and the second battery cell row 122. Predetermined clearances are formed between the first battery cell row 121 and the second battery cell row 122, between the individual lithium ion battery cells 140 set side-by-side along the lengthwise direction of the first battery cell row 121 and between the lithium ion battery cells 140 set side-by-side along the lengthwise direction of the second battery cell row 122 and inter-cell passages 192 are formed with these clearances. An intake-side guide passage 193 is formed between the intake-side guide plate 112 and the lithium ion battery cells 140 assuming the positions closest to the cooling medium intake 114 in the first battery cell row 121 and the second battery cell row 122. An outlet-side guide passage 194 is formed between the outlet-side guide plate 113 and the lithium ion battery cells 140 assuming the positions closest to the cooling medium outlet 115 in the first battery cell row 121 and the second battery cell row 122.

The intake-side passage 190, the outlet-side passage 191, the inter-cell passages 192, the intake-side guide passage 193 and the outlet-side guide passage 194 are in communication with one another.

The intake-side passage 190 is a distribution-side passage through which the cooling medium 1 having flowed into the casing 11 via the cooling medium intake 114 is guided to the inter-cell passages 192 and the outlet-side guide passage 194, and extends linearly along the lengthwise direction from the cooling medium intake 114 toward the cooling medium outlet 115 along the first battery cell row 121 and the intake passage forming plate 111.

The outlet-side passage 191 is a collection-side passage through which the cooling medium 1 having flowed through the intake-side guide passage 193 and the inter-cell passages 192 is guided to the cooling medium outlet 115, and extends linearly along the lengthwise direction from the cooling medium intake 114 toward the cooling medium outlet 115 along the outlet flow passage forming plate (module base 101) and the second battery cell row 122.

The inter-cell passages 192 are an internal passages through which the cooling medium 1 having been guided to the intake-side passage 190 and the intake-side guide passage 193 is distributed over the entire assembled battery 120 and extend in various directions inside the assembled battery 120 in a network pattern.

The intake-side guide passage 193 is a passage through which the cooling medium 1 having flowed into the casing 110 through the cooling medium intake 114 is distributed through the area between the intake-side guide plate 112 and the lithium ion battery cells 140 assuming the positions closest to the cooling medium intake 114 in the first battery cell row 121 and the second battery cell row 122 and is then guided to the outlet-side passage 191. It extends diagonally from the cooling medium intake 114 toward the outlet-side passage 191 along the lithium ion battery cells 140 assuming the positions closest to the cooling medium intake 114 in the first battery cell row 121 and the second battery cell row 122 and also along the intake-side guide plate 112.

The outlet-side guide passage 194 is a passage through which the cooling medium 1 having been guided to the intake-side passage 190 is distributed through the area between the outlet-side guide plate 113 and the lithium ion battery cells 140 assuming the positions closest to the cooling medium outlet 115 in the first battery cell row 121 and the second battery cell row 122 and is then guided to the cooling medium outlet 115. It extends diagonally from the intake-side passage 190 toward the cooling medium outlet 115 along the lithium ion battery cells 140 assuming the positions closest to the cooling medium outlet 115 in the first battery cell row 121 and the second battery cell row 122 and also along the outlet-side guide plate 113.

The cooling medium intake 114 is formed on a line extending along the lengthwise direction from the first battery cell row 121 and the intake-side passage 190. The cooling medium outlet 115 is formed on a line extending along the lengthwise direction from the second battery cell row 122 and the outlet-side passage 191. Thus, the cooling medium intake 114 and the cooling medium outlet 115 are offset relative to each other along the height-wise direction. Assuming that the side where the outlet flow passage forming plate (module base 101) is the installation side, the cooling medium intake 114 takes up a position higher than the position of the cooling medium outlet 115 in the embodiment.

Assuming that the side where the intake flow passage forming plate 111 is present along the height-wise direction is the higher side and the side where the outlet flow passage forming plate (module base 101) is present is the installation side, the position assumed by the central axis of the cooling medium intake 114 along the height-wise direction is higher than the position assumed by the central axis of the lithium ion battery cell 140 in the first battery cell row 121 taking up the position closest to the cooling medium intake 114 but is lower than the position taken up by the lithium ion battery cells 140 in the first battery cell row 121 at their portions closest to the intake-side passage 190 (toward the intake flow passage forming plate 111).

The position assumed by the central axis of the cooling medium outlet 115 along the height-wise direction is lower than the position assumed by the central axis of the lithium ion battery cell 140 in the second battery cell row 122 taking up the position closest to the cooling medium outlet 115 but is higher than the position assumed by the lithium ion battery cells 140 in the second battery cell row 122 at their portions closest to the outlet-side passage 191 (toward the outlet flow passage forming plate (module base 101)).

The lithium ion battery cell 140 disposed at the position closest to the cooling medium intake 114 in the first battery cell row 121 also functions as a cooling medium flow-dividing mechanism that divides the cooling medium 1 having flowed into the casing 110 via the cooling medium intake 114 into a cooling medium flow to travel into the intake-side passage 190 and a cooling medium flow to travel into the intake-side guide passage 193.

In the embodiment, the lithium ion battery cell 140 is used as a cooling medium flow-dividing mechanism and thus, the cooling medium 1 can be supplied into the intake-side guide passage 193 into which the cooling medium 1 cannot be distributed readily, without requiring a special flow-dividing mechanism.

While the roles of the cooling medium intake 114 and the cooling medium outlet 115 may be reversed and the cooling medium may be supplied through the cooling medium outlet 115, the lithium ion battery cell 140 assuming the position closest to the cooling medium outlet 115 in the second battery cell row 122 should function as the cooling medium flow-dividing mechanism in such a structure. A flow dividing function similar to that described above can be achieved when the cooling medium is distributed to the high potential-side battery block 100*a* by reversing the cooling medium intake/outlet assignment in this manner, since the structure of the high potential-side battery block 100*a* remains unchanged even as the high potential-side battery block 100*a* is rotated by 180° around the center of its section taken along the shorter span direction. In other words, the high potential-side battery block 100*a* assumes a rotationally symmetrical structure (or a reversible structure).

In the high potential-side battery block 100*a* adopting a rotationally symmetrical structure, the cooling medium supplied through the cooling medium intake 114 to flow through the high potential-side battery block 100*a* and the cooling medium supplied through the cooling medium outlet 115 to flow through the high potential-side battery block 100*a* travel along different directions but the manner in which the cooling medium flows is identical in both directions, achieving exactly the same cooling effect in both flow paths. Thus, the embodiment allows the sequence of cooling to be achieved with the cooling medium to be switched, i.e., from the "battery module 100→inverter device 20" sequence to the sequence "inverter device 20→battery module 100" and vice versa. For instance, the embodiment allows the cooling medium to be supplied in the "inverter device 20→battery module 100" sequence when the battery module 100 needs an initial warm up with warm cooling medium, and allows the cooling medium to be supplied in the sequence "battery module 100→inverter device 20" otherwise, i.e., when the battery module 100 needs to be cooled with the cooled cooling medium. In addition, the embodiment allows the cooling medium supply position assumed along the height-wise direction to be switched from the side where the intake flow passage forming plate 111 is present to the side where the outlet flow passage forming plate (module base 101) is present and vice versa.

Figure 9:
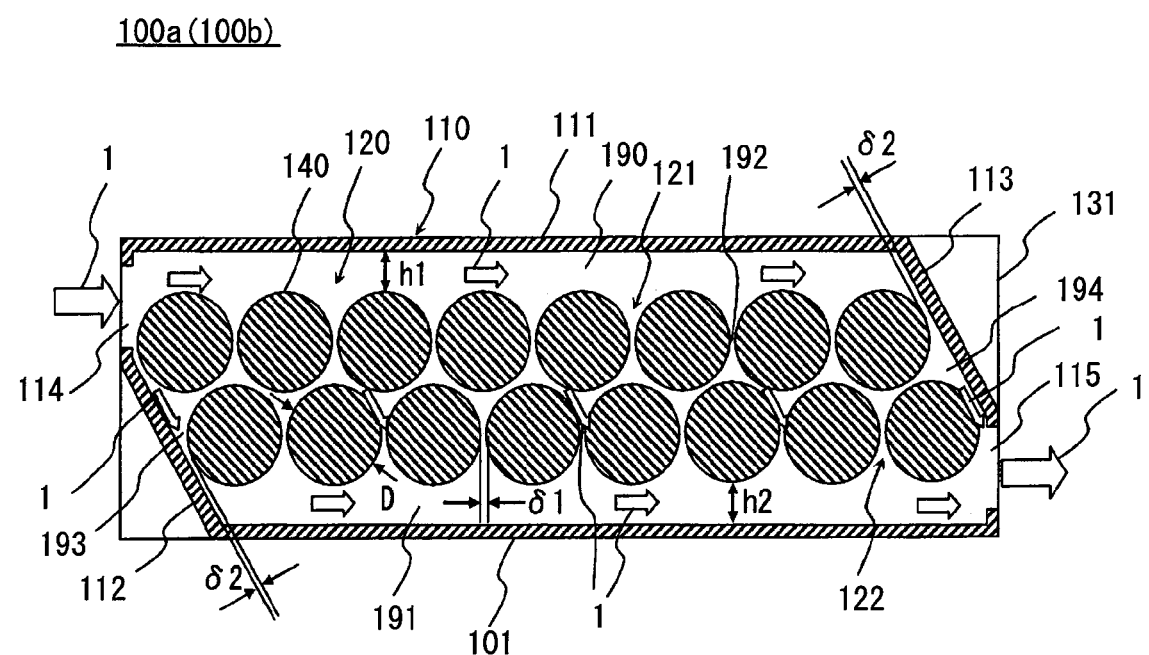
FIG. 9 is a sectional view taken along IX-IX in FIG. 7.
Figure 10:
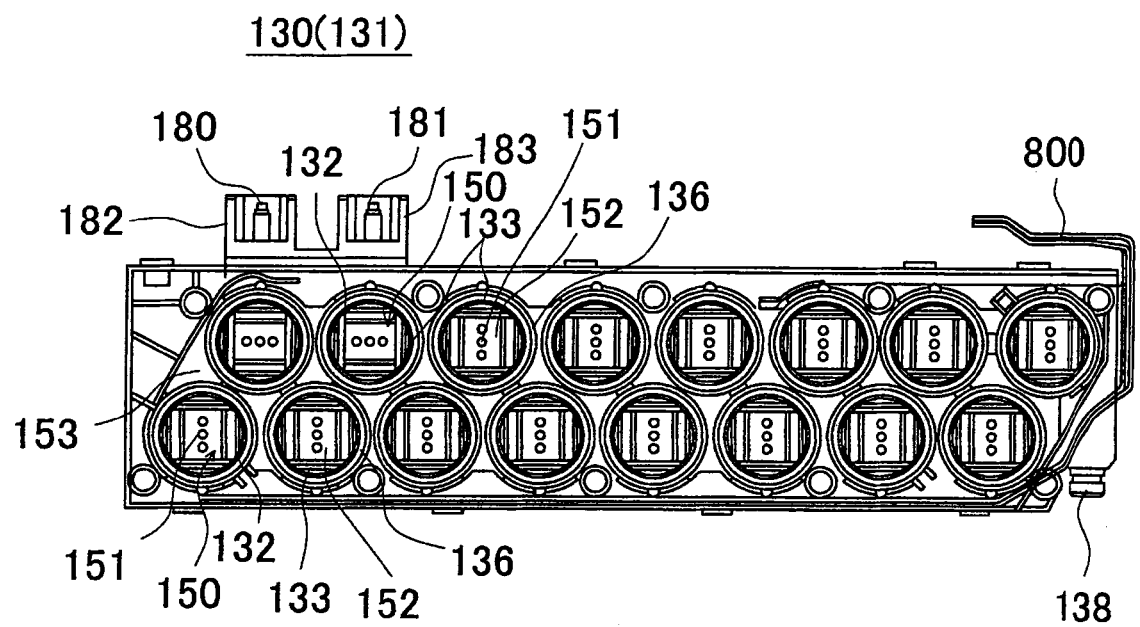
FIG. 10 is a plan view of the structure adopted at the side plate in FIG. 2 on the lithium ion battery cell side.

Next, in reference to FIG. 9, the flow of the cooling medium 1 is explained.

As the fan installed at the cooling duct of the on-vehicle electrical system is driven, the air inside the cabin, to be used as the cooling medium 1, flows into the casing 110 via the cooling medium intake duct 116 and the cooling medium intake 114. The cooling medium 1 having flowed in first contacts the lithium ion battery cell 140 disposed at the position closest to the cooling medium intake 114 in the first battery cell row 121. Consequently, the initial flow of the cooling medium 1 is divided into a main flow to travel through the intake-side passage 190 and a sub flow to travel through the intake-side guide passage 193 at a flow rate lower than that of the main flow.

As the cooling medium 1 in the main flow traveling through the intake-side passage 190 flows from the cooling medium intake 114 toward the outlet-side guide passage 194, it cools the lithium ion battery cells 140 in the first battery cell row 121 on the side facing toward the intake flow passage forming plate 111 and is distributed into the individual inter-cell passages 192 and the outlet-side guide passage 194, thereby becoming a plurality of divided flows.

As the cooling medium 1 in the sub flow traveling through the intake-side guide passage 193 flows from the cooling medium intake 114 toward the outlet-side passage 191, it cools the lithium ion battery cells 140 taking up the positions closest to the cooling medium intake 114 in the first battery cell row 121 and the second battery cell row 122 on the side thereof facing toward the cooling medium intake 114 before the cooling medium, traveling in a diagonal flow, reaches the outlet-side passage 191.

The cooling medium in the divided flows traveling through the various inter-cell passages 192 cools the outer circumferential surfaces of the individual lithium ion battery cells 140 as it travels from the intake-side passage 190 through the inter-cell passages 192 with a relative tilt, as indicated by the diagonal arrows in FIG. 9, before it reaches the outlet-side passage 191.

The cooling medium 1 in the divided flow traveling through the outlet-side guide passage 194 cools the lithium ion battery cells 140 assuming the positions closest to the cooling medium outlet 115 in the first battery cell row 121 and the second battery cell row 122 on the side thereof facing toward the cooling medium outlet 115 as it flows diagonally from the intake-side passage 190 toward the cooling medium outlet 115.

The collected flow of the cooling medium 1 traveling through the outlet-side passage 191 is formed as the sub flow of the cooling medium 1 having traveled through the intake-side guide passage 193 and the divided flows of the cooling medium 1 having traveled through the various inter-cell passages 192 join one another. The cooling medium in the collected flow cools the lithium ion battery cells 140 in the second battery cell row 122 on the side thereof facing toward the outlet flow passage forming plate (module base 101) as it flows from the intake-side guide passage 193 toward the cooling medium outlet 115.

The height (h1) measured from the lithium ion battery cells 140 in the first battery cell row 121, at the point closest to the intake flow passage forming plate 111, to the inner wall surface of the intake flow passage forming plate 111 along the height-wise direction, and the height (h2) measured from the lithium ion battery cells 140 in the second battery cell row 122, at the point closest to the outlet flow passage forming plate (module base 101), to the inner wall surface of the outlet flow passage forming plate (module base 101) along the height-wise direction, are set equal to each other.

In addition, the heights h1 and h2 are set to a value that is greater than the gap ($\delta 1$) representing the smallest distance measured between adjacent lithium ion battery cells 140 set side-by-side along the lengthwise direction (the direction along which the lithium ion battery cells 140 are arrayed) in the first battery cell row 121 and the second battery cell row 122. The heights h1 and h2 are also set greater than the gap ($\delta 2$) measured along the lengthwise direction from the lithium ion battery cells 140 taking up the positions closest to the cooling medium intake 114 (cooling medium outlet 115) in the first battery cell row 121 and the second battery cell row 122, at the point closest to the cooling medium intake 114 (cooling medium outlet 115), to the inner wall surface of the intake-side guide plate 112 (outlet-side guide plate 113) but smaller than the diameter D of the lithium ion battery cells 140.

It is desirable to minimize the heights h1 and h2 as long as the pressure loss in the high potential-side battery block 100$a$ remains within the allowable range, in order to further reduce the overall height of the battery module 100 and thus provide the battery module 100 as a more compact unit. However, if the heights h1 and h2 are set to an excessively small value, a greater degree of turbulence in the cooling medium is bound to occur during the process of heat transfer, which promotes heat exchange between the lithium ion battery cells 140 and the cooling medium. As a result, a phenomenon whereby the lithium ion battery cells 140 take on higher temperatures on the downstream side of the cooling medium flow will occur and, under such circumstances, the lithium ion battery cells 140 will not be cooled evenly. From the viewpoint of hydrodynamics, the heights h1 and h2 set to an excessively small value will increase the pressure loss in the high potential-side battery block 100$a$, to compromise the cooling effect on the lithium ion battery cells 140.

Based upon an analysis conducted by taking into consideration the factors discussed above, the height h1 and the height h2 are both set to 0.25 to 0.5 times the diameter D in the embodiment.

Once the ratio of the height h1 and the diameter D becomes less than 0.25, the pressure loss increases drastically. In addition, the extent of pressure loss is significant when the ratio of the height h1 and the diameter D exceeds 0.5. These phenomena are attributable to the fact that the pressure loss occurring in the inter-cell passages 192 is a dominant factor in the overall pressure loss while the pressure loss occurring in the intake-side passage 190 and the outlet-side passage 191 are not a dominant factor.

In the embodiment, optimal passage structures are adopted for the intake-side passage 190 and the outlet-side passage 191 so as to reduce the pressure loss in the cooling medium passages at the high potential-side battery block 100$a$ and prevent the lithium ion battery cells 140 located on the downstream side with respect to the flow of the cooling medium 1 from becoming overheated by preventing excessive turbulence in the flow of the cooling medium 1. Thus, the embodiment promotes thermal contact between the cooling medium 1 and the individual lithium ion battery cells 140, more effectively reduces the extent to which the temperature of the lithium ion battery cells 140 rises as they are charged/discharged (improves the cooling effect) and makes it possible to cool the plurality of lithium ion battery cells 140 with better uniformity.

In terms of hydrodynamics, the gaps $\delta 1$ and $\delta 2$ function as pores in a type of porous plate, which rectify the flow of the cooling medium 1. As a result, the cooling medium 1 can be distributed at a uniform flow rate through the gaps δ1 and δ2 by selecting the optimal settings for the dynamic pressure of the cooling medium 1 supplied through the cooling medium intake 114 and for the pressure loss occurring at the gaps δ1 and δ2. In addition, by setting the sizes of the gaps δ1 and δ2 substantially equal to each other, even better uniformity can be achieved with regard to the flow rates at which the cooling medium 1 is distributed through the gaps δ1 and δ2.

Based upon the results of an analysis conducted by taking into consideration the factors discussed above, the sizes of the gaps δ1 and δ2 are set equal to or greater than 0.03 times the diameter D and preferably, 0.03 to 0.07 times the diameter D in the embodiment.

The extent of pressure loss increases drastically once the ratio of the gap δ1 and the diameter D becomes less than 0.03, since pressure loss in the inter-cell passages 192 is the dominant factor in the overall pressure loss. In addition, the extent of pressure loss is not decreased significantly even when the ratio of the gap δ1 and the diameter D exceeds 0.07.

In the embodiment, optimal passage structures are adopted in the inter-cell passages 192, the intake-side guide passage 193 and the outlet-side guide passage 194, so as to assure uniform distribution of the cooling medium 1 into the inter-cell passages 192, the intake-side guide passage 193 and the outlet-side guide passage 194. Thus, the individual lithium ion battery cells 140 can be cooled with the cooling medium 1 distributed at a uniform flow rate and the extent of temperature increase at the various lithium ion battery cells 140 can be evenly reduced by adopting the embodiment.

Furthermore, the embodiment reduces the cooling distance over which the lithium ion battery cells are cooled with the cooling medium 1 flowing at the uniform flow rate to that equivalent to the diameters (2D) of two lithium ion battery cells 140. Thus, the embodiment further improves the heat transfer between the cooling medium 1 flowing at the uniform flow rate and the individual lithium ion battery cells 140 and further reduces the extent of temperature increase at the lithium ion battery cells 140 occurring as they are charged/discharged (further improves the cooling effect).

The connection lines 800 are voltage detection lines used to detect voltages at the individual lithium ion battery cells 140. They extend from the casing of the control device 900 to be detailed later to the individual battery blocks, run over the side surfaces of the side plates 130 and 131 facing toward the lithium ion battery cells 140 and are connected to portions of the corresponding conductive members 150, i.e., exposed portions 153 projecting out from the side surfaces of the side plates 130 and 131 facing toward the lithium ion battery cells 140. The connection lines 800 are constituted with insulated wires. The end of each connection line 800 located on the side toward the control device 900 is formed as a connector that can be plugged into a connector at the control device 900.

The low potential-side battery module 100*b* assumes a structure identical to the structure of the high potential-side battery module 100*a*. Accordingly, the same reference numerals are assigned to components of the low potential-side battery module 100*b*, which are identical to the components of the high potential-side battery module 100*a*, so as to preclude the need for an explanation of the low potential-side battery module 100*b*.

Next, a method that may be adopted for manufacturing, and more specifically assembling, the high potential-side battery module 100*a* (the low potential-side battery module 100*b*) is described.

When assembling the high potential-side battery module 100*a* (the low potential-side battery module 100*b*), the sixteen lithium ion battery cells 140 are first set in place. In step 1, the sixteen lithium ion battery cells 140 are placed on a transfer stage in a formation matching the pattern assumed in the assembled battery 120. At this time, a jig is used to support the lithium ion battery cells 140 so as to position them in an upright orientation on the transfer stage, i.e., so as to position the lithium ion battery cells 140 with their terminal surfaces set perpendicular to the vertical orientation relative to the transfer stage (with the central axes ranging along the vertical direction).

Next, in step 2, either the side plates 130 or the side plate 131 is attached via the seal members 137 onto the individual lithium ion battery cells 140 in the upright state, so as to place the welding areas 152 of the conductive members 150 in contact with the terminal surfaces of the lithium ion battery cells 140, the conductive members 150 and the terminals at the lithium ion battery cells 140 are welded together through spot welding while the side plate 130 or 131 is held with a specific pressure and a first assembly is thus produced.

Next, in step 3, the first assembly is turned upside down so as to set the welded areas over which the side plate 130 or 131 is welded with the individual lithium ion battery cells 140 to the bottom and the un-welded side of the lithium ion battery cells 140 to the top. Then, the other side plate 131 or 130 is attached via the seal members 137 onto the un-welded side of the lithium ion battery cells 140, the conductive members 150 and the terminals at the lithium ion battery cells 140 are welded together through spot welding while holding the side plate 131 or 130 with a predetermined pressure and thus, a second assembly is produced.

It is to be noted that while an assembly process through which either one of the side plates 130 and 131 is attached to the lithium ion battery cells 140, the conductive members 150 are welded onto the terminal surfaces at the individual lithium ion battery cells 140, the other side plate 131 or 130 is attached to the lithium ion battery cells 140 and the conductive members 150 are welded onto the terminal surfaces of the lithium ion battery cells 140 has been described in reference to the embodiment, the battery module may instead be assembled by attaching the various lithium ion battery cells 140 to either the side plate 130 or the side plate 131, attaching the other side plate 131 or 130 to the lithium ion battery cells 140 and then welding the conductive members 150 with the terminals at the lithium ion cells battery 140 through welding.

Next, in step 4, the integrated unit that includes the intake flow passage forming plate 111, the intake-side guide plate 112, the outlet-side guide plate 113, the cooling medium intake 114, the cooling medium outlet 115, the cooling medium intake duct 116 and the cooling medium outlet duct 117 is attached to the second assembly via a seal member (not shown) and the integrated unit is locked onto the side plates 130 and 131 via locking means such as bolts, screws or rivets, thereby producing a third assembly.

It is to be noted that the connection lines 800 disposed in advance at the side plates 130 and 131 are joined at the exposed portions 153 of the conductive members 150.

Then, in step 5, the shield members 160 are attached individually to the side plates 130 and 131 via the seal members 135 and the shield members 160 are locked onto the side plates 130 and 131 via locking means such as bolts, screws or rivets, thereby producing a fourth assembly.

Next, in step 6, two fourth assemblies are placed side-by-side, the module base 101 is attached onto the two fourth assemblies, the module base 101 is locked onto the side plates 130 and 131 via locking means such as bolts, screws or rivets, and the support members 102 and 103 are locked onto the ends of the two fourth assemblies on both sides of the lengthwise direction and the casing of the control device 900 is locked over the center of the two fourth assemblies along the lengthwise direction individually via locking means such as bolts, screws or rivets, thereby producing a fifth assembly.

It is to be noted that while an assembly process through which the integrated unit made up with the intake flow passage forming plate 111, the intake-side guide plate 112, the outlet-side guide plate 113, the cooling medium intake 114, the cooling medium outlet 115, the cooling medium intake duct 116 and the cooling medium outlet duct 117, the shield members 160 and the module base 101 are locked onto the assembly in this order, has been described in reference to the embodiment, the order in which these members are locked may be altered. The various members may be locked onto the assembly in any of six different sequences, including the sequence described above.

Then, in step 7, the connectors of the connection lines 800 are connected to the connectors at the control device 900, connectors at signal lines extending from the plurality of temperature sensors (not shown) installed at the individual battery blocks in the battery module 100 are connected to a connector at the control device 900 and a connector of a communication line via which communication with a higher-order control device such as the vehicle controller 30 or the motor controller 23 is conducted, is connected to a connector at the control device 900.

The lithium ion battery device 1000 is assembled by following the assembly steps 1 to 7 described above.

The following advantages represent the primary benefits of the embodiment described above.

In the embodiment, the conductive members 150, via which the lithium ion battery cells 140 are electrically connected with one another, and the lithium ion battery cells 140 are connected together in the gas release chambers 170. Thus, there is no need to create a special space for the connection of the lithium ion battery cells 140 and the conductive members 150, and the storage chamber (or cooling chamber) where the lithium ion battery cells 140 are housed and the gas release chambers 170 can be provided through efficient utilization of the available space in the battery module 100. Consequently, the lithium ion battery cells 140 can be exposed into the cooling chamber over large surface areas in the storage chamber (or cooling chamber), thereby assuring efficient cooling of the lithium ion battery cells 140 and enhanced performance characteristics for the battery module 100. At the same time, the gas release chambers 170 are allowed to assume a greater volumetric capacity and thus, the gas emitted from the lithium ion battery cells 140 can be defused more readily, which makes it possible to reduce the temperature and pressure of the released gas more effectively. Furthermore, since the gas temperature and pressure can be reduced easily, the loads applied to the side plates 130 and 131 and the shield members 160 and the loads applied to the seal members 135 and 137 can be reduced.

In addition, the seal members 137 and the seal members 135 assures a high degree of airtightness and water-tightness by sealing any gaps that may be present between the lithium ion battery cells 140 and the side plates 130 and 131 and any gaps that may be present between the shield members 160 and the side plates 130 and 131 in the embodiment. Thus, the gas vapor containing a liquid such as the electrolyte, emitted from the lithium ion battery cells 140, does not leak to the outside through the gas release chambers 170 or is not allowed to flow into the storage chamber (or the cooling chamber) via the gas release chambers 170.

Moreover, the through holes 151 are formed at the conductive members 150 in the embodiment so as to release the gas emitted from the lithium ion battery cells 140 to the gas release chambers 170 through the through holes 151, thereby assuring more reliable release of the gas emitted from the lithium ion battery cells 140.

Also, the gas released into the gas release chambers 170 is discharged through the bottoms of the side plates 130 and 131 via the gas discharge passage 138 and the gas discharge pipe 139 and is thus guided to the outside in the embodiment. This means that the gas vapor containing a liquid such as the electrolyte having been emitted from the lithium ion battery cells 140, can be discharged instead of becoming collected at the gas release chambers 170.

In addition, since the gas discharge pipe 139 in the embodiment is connected to the piping 2000 laid out in the vehicle 3000 so as to extend downward from the installation location of the lithium ion battery device 1000 toward the ground upon which the vehicle travels. Thus, the gas emitted from the lithium ion battery cells 140 can be discharged to the outside of the vehicle via the piping.

The embodiment assures better thermal contact between the cooling medium 1 and the individual lithium ion battery cells 140 and allows the cooling medium 1 to be distributed at a uniform flow rate toward the various lithium ion battery cells 140, making it possible to further reduce the extent of temperature increase occurring at the lithium ion battery cells 140 as they are charged/discharged and achieve uniformity in the extent of temperature increase at the individual lithium ion battery cells 140. Thus, by adopting the embodiment, the lithium ion battery cells 140 can be cooled with an even higher level of cooling performance and a range of variance with regard to the charge/discharge quantities and the lengths of service life among the individual lithium ion battery cells 140 can be further reduced.

In addition, the embodiment allows the cooling medium 1, drawn through the cooling medium intake 114 into the casing 110 to be distributed evenly to the plurality of lithium ion battery cells 140, helping to cool the lithium ion battery cells 140 evenly.

Furthermore, the embodiment achieves uniformity with regard to the extent of temperature increase at the individual lithium ion battery cells 140 and thus, the range of temperature distribution, i.e., the range of temperatures detected at the lithium ion battery cells 140 disposed closer to the cooling medium intake 114 and the temperatures detected at the lithium ion battery cells 140 disposed toward the cooling medium outlet 150, can be minimized.

Moreover, the lithium ion battery cell 140 taking up the position closest to the cooling medium intake 114 is utilized in the embodiment as a flow dividing mechanism for dividing the flow of the cooling medium 1 having been drawn through the cooling medium intake 114 into the casing 110, thereby eliminating the need for installing a special flow dividing mechanism in the casing 110 and allowing the cooling medium 1 to be distributed into the intake-side guide passage 193 with ease.

By disposing the lithium ion battery cells 140 in a specific pattern so as to form optimal flow passages inside the casing 110 and setting the dimensions for the flow passages based upon the diameter D of the lithium ion battery cells 140 as has been described in reference to the embodiment, the high potential-side battery by 100*a* and the low potential-side battery block 100*b* for which high-performance cooling is assured, i.e., the high potential-side battery block 100*a* and the low potential-side battery block 100*b* that assure better thermal contact between the cooling medium 1 and the individual lithium ion battery cells 140 and allow the cooling medium 1 to be distributed toward the various lithium ion battery cells 140 with a uniform flow rate, can be achieved with relative ease.

Moreover, by disposing the first battery cell row 121 and the second battery cell row 122 with an offset relative to each other along the lengthwise direction as has been described in reference to the embodiment, the measurement of the assembled battery 120 taken along the height-wise direction can be reduced and the height-wise dimensions of the high potential-side battery block 110a and the low potential-side battery block 100b can be reduced. As a result, the measurement of the battery module 100, taken along the height-wise direction, can be reduced in the embodiment.

Figure 11:
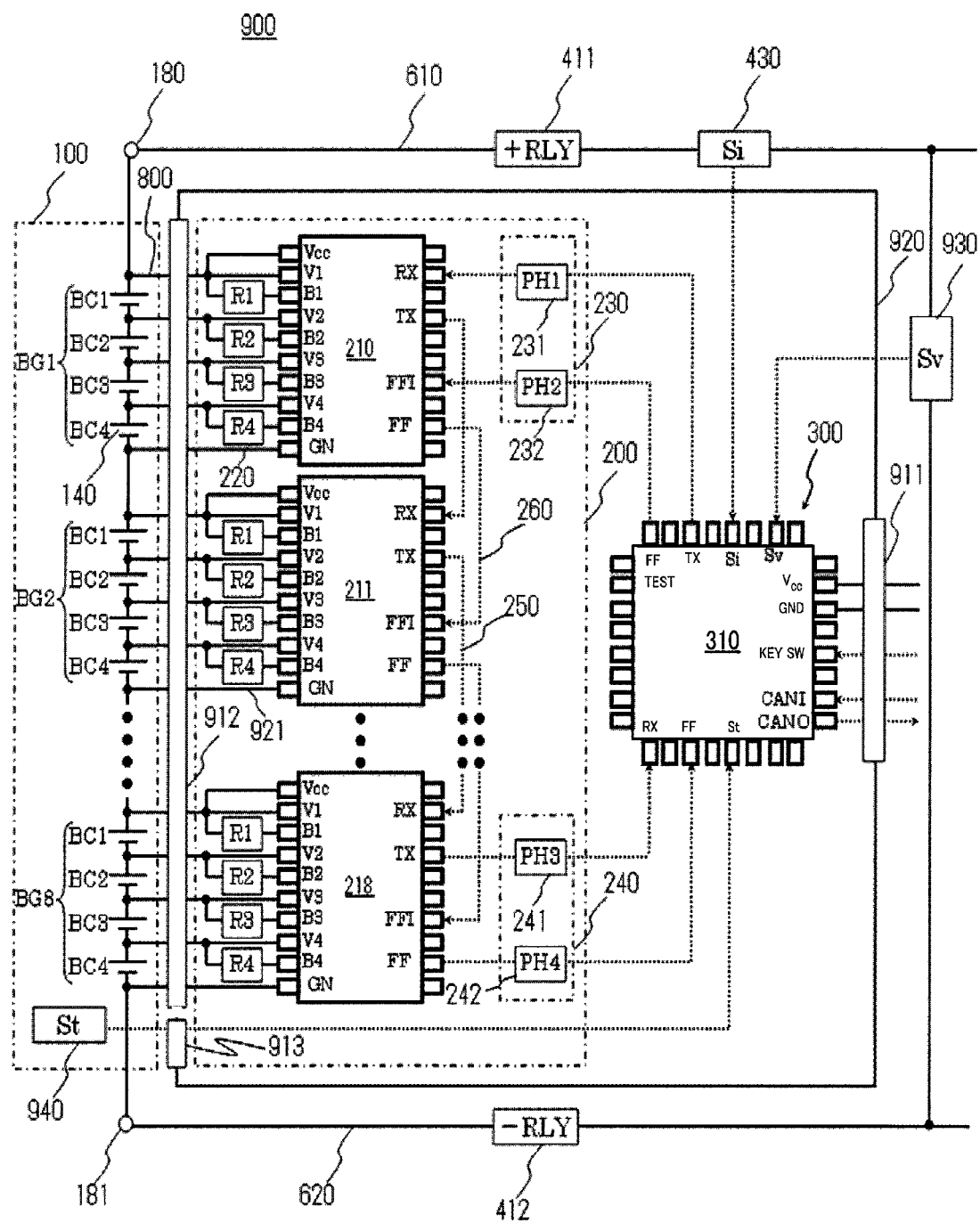
FIG. 11 is a circuit block diagram showing the structure of the controller in the lithium ion battery device in FIG. 5.

Next, in reference to FIG. 11, the control device 900 is described.

The control device 900 is an electronic circuit device installed atop the battery module 100, i.e., disposed astride both the high potential-side battery module 100a and the low potential-side battery module 100b. It includes a casing 910 and a single circuit board 920 housed inside the casing 910.

The casing 910 is a flat rectangular parallelepiped metal box that is locked onto the high potential-side battery module 100a and the low potential-side battery module 100b via locking means such as bolts or screws. Thus, the high potential-side battery module 100a and the low potential-side battery module 100b are connected and fixed at their ends of the shorter span direction, that is, at their longer sides, via the control device 900. Namely, the control device 900 also functions as a support member to further improve the strength of the battery module 100 in the embodiment.

Electronic circuit components constituting the cell controller 200 and electronic circuit components constituting the battery controller 300 are mounted at the circuit board 920. The electronic circuit components constituting the cell controller 200 include eight integrated circuits (ICs) 210~218 electrically connected to the corresponding lithium ion battery cells 140. The electronic circuit components constituting the battery controller 300 include a single microcomputer 310.

The cell controller 200 also includes a plurality of circuit elements such as a plurality of resistors 220, a photocoupler unit 230 and a photocoupler unit 240.

The state of charge at a lithium ion battery cell 140 is adjusted via a resistor 220, which is a consumption circuit element that consumes the current released from the lithium ion battery cell 140 by converting it to heat. Four such resistors (R1 to R4) are installed in correspondence to each of the integrated circuits 210 to 218.

The photocoupler unit 230 is an interface circuit installed in the signal transmission path extending between the integrated circuit 210 located at the leading end among the integrated circuits 210 to 218 and the microcomputer 310, and includes photocouplers 231 and 232, which are optically insulated elements used to exchange signals at varying potential levels. The photocoupler unit 240 is an interface circuit installed in the signal transmission path extending between the integrated circuit 218 located at the trailing end among the integrated circuits 210 to 218 and the microcomputer 310, and includes photocouplers 241 and 242, which are optically insulated elements used to exchange signals at varying potential levels.

In the embodiment, a plurality of connectors are disposed at one of the side surfaces of the casing 910, i.e., at the side surface facing the side where the cooling medium flows in. The plurality of connectors includes a voltage detection connector 912 and a temperature detection connector 913. The connectors (not shown) at the connection lines 800 electrically connected to the 32 lithium ion battery cells 140 are connected to the voltage detection connector 912. The connectors (not shown) at the signal lines extending from a plurality of temperature sensors 940 installed in the battery module 100 are connected to the temperature detection connector 913.

A connector 911 used to establish an external connection is disposed at another side surface of the casing 910, i.e., the side surface facing toward the side on which the cooling medium flows out in the embodiment. Connectors (not shown) at the power line through which the drive power is supplied to the battery controller 300, the signal line through which the ignition key switch ON/OFF signal is input, the communication lines enabling communication with the vehicle controller 30 and the motor controller 23 and the like are connected to the connector 911 for external connection.

The plurality of lithium ion battery cells 140 are divided into a plurality of groups each corresponding to one of the integrated circuits 210 to 218. In the embodiment, the 32 lithium ion battery cells 140, made up with the sixteen lithium ion battery cells 140 constituting the assembled battery 120 in the high potential-side battery block 100 and the sixteen lithium ion battery cells 140 constituting the assembled battery 120 in the low potential-side battery block 100, are divided into eight groups. More specifically, the 32 lithium ion battery cells 140 electrically connected in series are sequentially assigned to the eight groups, each made up with four lithium ion battery cells starting with the lithium ion battery cell having the highest-order potential, in the order matching the order with which the 32 lithium ion battery cells are connected. Namely, the 32 lithium ion battery cells 140 are sequentially designated to; a first group made up with the lithium ion battery cell 140 with the first-order potential through the lithium ion battery cell 140 with the fourth-order potential that are electrically connected in series, a second group made up with the lithium ion battery cell 140 with the fifth-order potential through the lithium ion battery cell 140 with the eighth-order potential that are electrically connected in series, . . . , a seventh group made up with the lithium ion battery cell 140 with the 25th-order potential through the lithium ion battery cell 140 with the 28th-order potential and an eighth group made up with the lithium ion battery cell 140 with the 29th-order potential through the lithium ion battery cell 140 with the 32nd-order potential.

It is to be noted that while the plurality of lithium ion battery cells 140 in each battery block are divided into four groups in the embodiment described above, the 32 lithium ion battery cells 140 may instead be divided into six groups. In such a case, the 32 lithium ion battery cells 140 electrically connected in series may be designated to; a first group made up with, for instance, four lithium ion battery cells 140 with the highest-order potential, a second group through a fifth group each made up with six lithium ion battery cells 140 with intermediate-order potentials and a sixth group made up with four lithium ion battery cells 140 with the lowest-order potentials.

The positive pole sides and the negative pole sides of the four lithium ion battery cells 140 (BC 1 to BC 4) constituting the first group are electrically connected to the integrated circuit 210 via the connection lines 800 and a board wiring 921. Thus, analog signals generated based upon the terminal voltages at the four lithium ion battery cells 140 constituting the first group are taken into the integrated circuit 210 via the connection lines 800 and the board wiring 921. The integrated circuit 210 is equipped with an analog/digital converter that sequentially converts the analog signals taken in to digital signals and the terminal voltages at the four lithium ion battery cells 140 constituting the first group are thus detected. The integrated circuits 211 to 218 are similar to the integrated circuit 210 in that the positive pole sides and the negative pole sides of the four lithium ion battery cells 140 constituting each group are electrically connected to the corresponding integrated circuit via the connection lines 800 and the board wiring 921 and that the terminal voltages at the four lithium ion battery cells 140 constituting the group are taken into the integrated circuit and detected.

Between the positive pole sides and the negative pole sides (between the terminals) of the four lithium ion battery cells constituting the first group, bypass serial circuits each formed by electrically connecting in series a resistor 220 (R1, R2, R3 or R4) and a switching semiconductor element built into the integrated circuit 210, are connected via the connection lines 800 and the board wiring 921 in an electrically parallel configuration. The other groups are similar to the first group in that bypass serial circuits are connected in an electrically parallel configuration between the positive pole sides and the negative pole sides of the lithium ion battery cells 140.

Based upon a charge state adjust command output from the battery controller 300, the integrated circuit 210 sets the individual switching semiconductor elements in a state of continuity over a predetermined length of time, so as to electrically connect in parallel the individual bypass serial circuits between the positive pole sides and the negative pole sides of the four lithium ion battery cells 140 constituting the first group. As a result, each lithium ion battery cell 140 with the corresponding bypass serial circuit electrically connected in parallel is discharged and its SOC (state of charge) is thus adjusted. As does the integrated circuit 210, the integrated circuits 211 to 218 each individually control the continuity for the switching semiconductor elements in the bypass serial circuits electrically connected in parallel to the four lithium ion battery cells 140 constituting the corresponding group so as to individually adjust the states of charge SOC at the four lithium ion battery cells 140 constituting the group.

By individually adjusting the states of charge SOC of the four lithium ion battery cells 140 constituting each group through individual control of the states of continuity of the switching semiconductor elements in the bypass serial circuits electrically connected in parallel to the four lithium ion battery cells 140 via the corresponding integrated circuit among the integrated circuits 210 to 218 as described above, uniformity can be achieved with regard to the states of charge SOC at the lithium ion battery cells 140 in all the groups and an overcharge, for instance, of any lithium ion battery cells 140 can be prevented.

The integrated circuits 210 to 218 each detect any error state relating to the four lithium ion battery cells 140 in the corresponding group. Such an error state may indicate an overcharge or an over-discharge. An overcharge or an over-discharge is detected by each of the integrated circuits 210 to 218 by comparing the terminal voltage values detected for the four lithium ion battery cells constituting the corresponding group with an overcharge threshold value and an over-discharge threshold value. An overcharge is detected if a detected terminal voltage value exceeds the overcharge threshold value, whereas an over-discharge is detected if a detected terminal voltage value is less than the over-discharge threshold value. In addition, the integrated circuits 210 to 218 each execute self diagnosis for any error occurring in the internal circuit, e.g., a self diagnosis for an error in a switching semiconductor element used for SOC adjustment, an abnormal temperature or the like.

The integrated circuits 210 to 218 are constituted with identical internal circuits so as to fulfill the same functions as those described above, i.e., terminal voltage detection for the four lithium ion battery cells 140 (BC1 to BC4) constituting the corresponding group, SOC adjustment, error state detection and self diagnosis for errors occurring in the subject internal circuit.

A plurality of terminals to be electrically connected with the battery module 100 are disposed on one side of each of the integrated circuits 210 to 218. The plurality of terminals include a source terminal (Vcc), voltage terminals (V1 to V4, GND) and bypass terminals (B1 to B4). The board wiring 921 that is electrically connected to the connection lines 800 is also electrically connected to the voltage terminals (V1 to V4, GND). The switching semiconductor element side of each resistor 220 is electrically connected via the board wiring 921 to one of the bypass terminals (B1 to B4). The resistors 220 are connected, on the side opposite from the switching semiconductor element side, to the board wiring 921, electrically connected to the voltage terminals via the board wiring 921. The source terminal (Vcc) is electrically connected to the board wiring 921 electrically connected to the voltage terminal V1 (the voltage terminal electrically connected to the positive pole-side of the lithium ion battery cell 140 on the highest potential side).

The voltage terminals (V1 to V4, GND) and the bypass terminals (B1 to B4) are disposed in an alternating pattern in the order matching the order in which the lithium ion battery cells 140 with varying potentials are electrically connected. As a result, a circuit electrically connecting each of the integrated circuits 210 to 218 with the corresponding connection lines 800 can be formed with ease.

The negative pole-side of the lithium ion battery cell BC having the lowest potential among the four lithium ion battery cells 140 constituting the corresponding group is electrically connected to the voltage terminal GND. Thus, the integrated circuits 210 to 218 are each able to operate by using the lowest potential in the corresponding group as a reference potential. Provided that the individual integrated circuits 210 to 218 operate based upon varying reference potentials, as in this case, the variance among the voltages applied from the battery module 100 to the various integrated circuits 210 to 218 can be reduced, which, in turn, reduces the level of voltage withstanding performance required of the integrated circuits 210 to 218 and assures further improvements in safety and reliability.

The positive pole-side of the lithium ion battery cell BC1 having the highest potential among the four lithium ion battery cells 140 constituting the corresponding group is electrically connected to the source terminal Vcc. Thus, the integrated circuits 210 to 218 each generate a voltage (e.g., 5 v) to be used to run the internal circuit based upon the voltage at the highest potential in the corresponding group. By generating the operating voltage used to run the internal circuit in each of the integrated circuits 210 to 218 based upon the voltage at the highest potential in the corresponding group as described above, uniformity can be achieved with regard to the power consumed at the four lithium ion battery cells 140 constituting the group and ultimately, the required level of uniformity with respect to the states of charge SOC at the four lithium ion battery cells 140 constituting the corresponding group can be sustained.

A plurality of communication terminals are disposed on the other side (the side facing opposite the side where the voltage terminals are disposed) at each of the integrated circuits 210 to 218. The plurality of terminals include communication command signal transmission/reception terminals (TX and RX) through which communication command signals are transmitted/received and error signal transmission/ reception terminals (FFO and FFI) through which error signals or error test signals are transmitted/received.

The communication command signal transmission/reception terminals (TX and RX) at the integrated circuits 210 to 218 are electrically connected in series in an non-insulated state in the order matching the potential levels of the corresponding groups. Namely, the communication command signal transmission terminal (TX) at the integrated circuit 210 (the integrated circuit with the higher-order potential) and the communication command signal reception terminal (RX) at the integrated circuit 211 (the integrated circuit with a lower-order potential, the potential of which is directly under the potential level at the integrated circuit with the higher-order potential) are electrically connected in series in the non-insulated state, the communication command signal transmission terminal (TX) at the integrated circuit 211 and the communication command signal reception terminal (RX) at the integrated circuit 212 are electrically connected in series in the non-insulated state, . . . , the communication command signal transmission terminal (TX) at the integrated circuit 217 and the communication command signal reception terminal (RX) at the integrated circuit 218 are electrically connected in series in the non-insulated state, so as to connect the communication command signal transmission terminals (TX) and the communication command signal reception terminals (RX) in a serial electrical connection in the non-insulated state. This form of connection is referred to as a daisy-chain connection in the description of the embodiment.

The error signal transmission/reception terminals (FFO and FFI) at the integrated circuits 210 to 218, too, are connected in a connection pattern similar to that with which the communication command signal transmission/reception terminals (TX and RX) are connected. In other words, they are electrically connected in series in the non-insulated state in the order matching the levels of the potentials assumed at the corresponding groups. Namely, the error signal transmission terminal (FFO) at the integrated circuit with the higher-order potential and the error signal reception terminals (FFI) at the integrated circuit with the lower-order potential, the potential level of which is directly under that assumed at the integrated circuit with the higher-order potential are electrically connected in series in the non-insulated state.

The light receiving side of the photocoupler 231 (PH 1) is electrically connected to the communication command signal reception terminals (RX) of the integrated circuit 210 corresponding to the group of lithium ion battery cells 140 with the highest potential. A communication command signal transmission terminal (TX) at the microcomputer 310 is electrically connected to the light-emitting side of the photocoupler 231. In addition, the light-emitting side of the photocoupler 241 (PH 3) is electrically connected to the communication command signal transmission terminal (TX) of the integrated circuit 218 corresponding to the group of lithium ion battery cells 140 with the lowest potential. A communication command signal reception terminal (RX) at the microcomputer 310 is electrically connected to the light receiving side of the photocoupler 241. Through these connections, a communication command signal loop transmission path 250, electrically insulated from the cell controller 200 and the battery controller 310, which extends from the microcomputer 310, through the photocoupler 231, the integrated circuit 210, . . . the integrated circuit 218 and the photocoupler 241 in this order, to return to the microcomputer 310, is formed between the cell controller 200 and the battery controller 310. The loop transmission path 250 is a serial transmission path.

A communication command signal output from the microcomputer 310 is transmitted through the communication command signal loop transmission path 250. The communication command signal, which is made up with a plurality of bytes of data having a plurality of areas such as data areas indicating communication (control) details set therein, is transmitted in a loop in the transmission sequence described above.

The communication command signal output from the microcomputer 310 to the integrated circuits 210 to 218 via the communication command signal loop transmission path 250 may be a request signal requesting information indicating the terminal voltages detected at the lithium ion battery cells 140, a command signal issued as an instruction for adjusting the states of charge at the lithium ion battery cells 140, a startup signal for individually setting the integrated circuits 210 to 218 in a sleep state to a wake-up state, i.e., for individually starting up the integrated circuits, a stop signal for individually setting the integrated circuits 210 to 218 in the wake-up state to the sleep state, i.e., for stopping the operation of the integrated circuits, an address setting signal issued when setting communication addresses in correspondence to the integrated circuits 210 to 218 or an error verification signal issued to verify an error state detected in the integrated circuits 210 to 218.

It is to be noted that while an explanation is given in reference to the embodiment on an example in which a communication command signal is transmitted by passing it on from the integrated circuit 210 toward the integrated circuit 218, the communication command signal may instead be transmitted by passing it on from the integrated circuit 218 and passed on toward the integrated circuit 210.

In addition, the light receiving side of the photocoupler 232 (PH 2) is electrically connected to the error signal reception terminal (FFI) of the integrated circuit 210 corresponding to the group of lithium ion battery cells 140 with the highest potential. An error test signal transmission terminals (FFT-EST) at the microcomputer 310 is electrically connected to the light-emitting side of the photocoupler 232. In addition, the light-emitting side of the photocoupler 242 (PH 4) is electrically connected to the error signal transmission terminal (FFO) of the integrated circuit 218 corresponding to the group of lithium ion battery cells 140 with the lowest potential. An error signal reception terminal (FF) at the microcomputer 310 is electrically connected to the light receiving side of the photocoupler 242. Through these connections, an error signal loop transmission path 260, electrically insulated from the cell controller 200 and the battery controller 300, which extends from the microcomputer 310, through the photocoupler 232, the integrated circuit 210, . . . the integrated circuit 218 and the photocoupler 242 in this order, to return to the microcomputer 310, is formed between the cell controller 200 and the battery controller 300. The loop transmission path 260 is a serial transmission path.

An error test signal output from the microcomputer 310 is transmitted through the error signal loop transmission path 260. The error test signal, which is a one-bit Hi level signal transmitted in order to detect an error at the integrated circuits 210 to 218, an error such as a disconnection of a communication circuit or the like, is transmitted in the transmission sequence described earlier. In the event of an error, the error test signal returns to the microcomputer 310 as a signal indicating Low level. The microcomputer 310 is thus able to detect an error having occurred at any of the integrated circuits 210 to 218, an error such as a disconnection of a communication circuit or the like. In addition, if an error is detected at any of the integrated circuits 210 to 218, a signal indicating an error is output from the integrated circuit where the error has been detected, e.g., the integrated circuit 212, to the error signal loop transmission path 260. The error signal is a one-bit signal and is passed on through; integrated circuit 213→ ... →integrated circuit 218→photocoupler 242 in this order and is delivered to the microcomputer 310. As a result, the integrated circuit with detected the error is able to report the error to the microcomputer 310 promptly.

It is to be noted that while an explanation is given in reference to the embodiment on an example in which the error test signal is transmitted by passing it on from the integrated circuit 210 toward the integrated circuit 218, the error test signal may instead be transmitted by passing it on from the integrated circuit 218 toward the integrated circuit 210. In addition, while the embodiment is described by assuming that the error signal generated at the integrated circuit with the error is transmitted toward the integrated circuit with the lower-order potential relative to the integrated circuit where the error has occurred, the error signal may instead be transmitted from the integrated circuit with the error toward the integrated circuit with the higher-order potential relative to the integrated circuit where the error has occurred.

The photocouplers 231, 232, 241 and 242 (PH 1 to PH 4) electrically insulate the communication command signal loop transmission path 250 and the error signal loop transmission path 260 located between the cell controller 200 and the battery controller 300. In addition, signals exchanged between the cell controller 200 and the battery controller 300 are converted to light and transmitted via the photocouplers. As described earlier, there are significant differences between the source potentials at the cell controller 200 and the battery controller 300 and between the source voltages at the cell controller 200 and the battery controller 300. For this reason, signals to be exchanged between the cell controller 200 and the battery controller 300 through electrical connection must undergo potential conversion and voltage conversion, which, in turn, requires a large-scale, expensive interface circuit for the cell controller 200 and the battery controller 300 and makes it difficult to provide a compact and low-cost controller. Accordingly, the communication between the cell controller 200 and battery controller 300 is achieved via the photocouplers 231, 232, 241 and 242 (PH 1 to PH 4) in the embodiment so as to provide a compact, low-cost controller.

In addition, varying source potentials are also assumed at the individual integrated circuits 210 to 218 as described earlier. However, the integrated circuits 210 to 218 in the embodiment are electrically connected in series, i.e., in a daisy-chain, in a sequence set in accordance with the levels of potentials at the corresponding groups in the assembled battery 120. Thus, the signal transmission among the individual integrated circuits 210 to 218 can be achieved with ease through potential conversion (level shift). The integrated circuits 210 to 218 are each equipped with a potential conversion (level shift) circuit disposed on the signal reception side. Accordingly, the signal transmission among the integrated circuits 210 to 218 can be achieved in the embodiment without having to install photocouplers, which are more expensive than other types of circuit elements, and thus, a more compact, lower cost controller can be provided.

The microcomputer 310 transmits to the cell controller 200 the communication command signal mentioned earlier, generated based upon input information obtained from various signals input thereto or based upon information indicating the results of arithmetic operation executed based upon the input information. The microcomputer also outputs a signal to a higher-order controller (the motor controller 23 or the vehicle controller 30).

The various types of signal input to the microcomputer 310 include terminal voltage signals indicating the terminal voltages at the various lithium ion battery cells 140, individually output from the integrated circuits 210 to 218, an error signal output from an integrated circuit with detected an error among the integrated circuits 210 to 218, a current sensor signal output from a current sensor 430 used to detect a charge/discharge current at the battery module 100, a voltage sensor signal output from a voltage sensor 930, used to detect the overall voltage at the battery module 100, a temperature sensor signal output from a temperature sensor (e.g., a thermistor element) 940 installed inside the battery module 100 to detect the temperature of a specific assembled battery 120, an ON/OFF signal generated in response to an ignition key switch operation and a signal output from the higher-order controller (the motor controller 23 or the vehicle controller 30).

The various types of signals output from the microcomputer 310 include the communication command signal mentioned earlier, signals providing information indicating the charge/discharge threshold power, the state of charge SOC, the state of health SOH and the like determined through arithmetic operation executed based upon the information indicating the conditions at the battery module 100 (e.g., the voltage, the current, the temperature and the like) and signals providing error status information (indicating, for instance, an overcharge, an over-discharge, an excessively high temperature and the like), obtained by executing arithmetic operations based upon the information indicating the conditions at the battery module 100 (e.g., the voltage, the current and the temperature) or obtained based upon error information.

Among these output signals, the signals corresponding to the information indicating the charge/discharge threshold power, the state of charge SOC, the state of health SOH and the like and the signals corresponding to the error status information (indicating, for instance, an overcharge, an over-discharge and an excessively high temperature) are output to the higher-order controller (the motor controller 23 or the vehicle controller 30).

-Second Embodiment-

Figure 14:
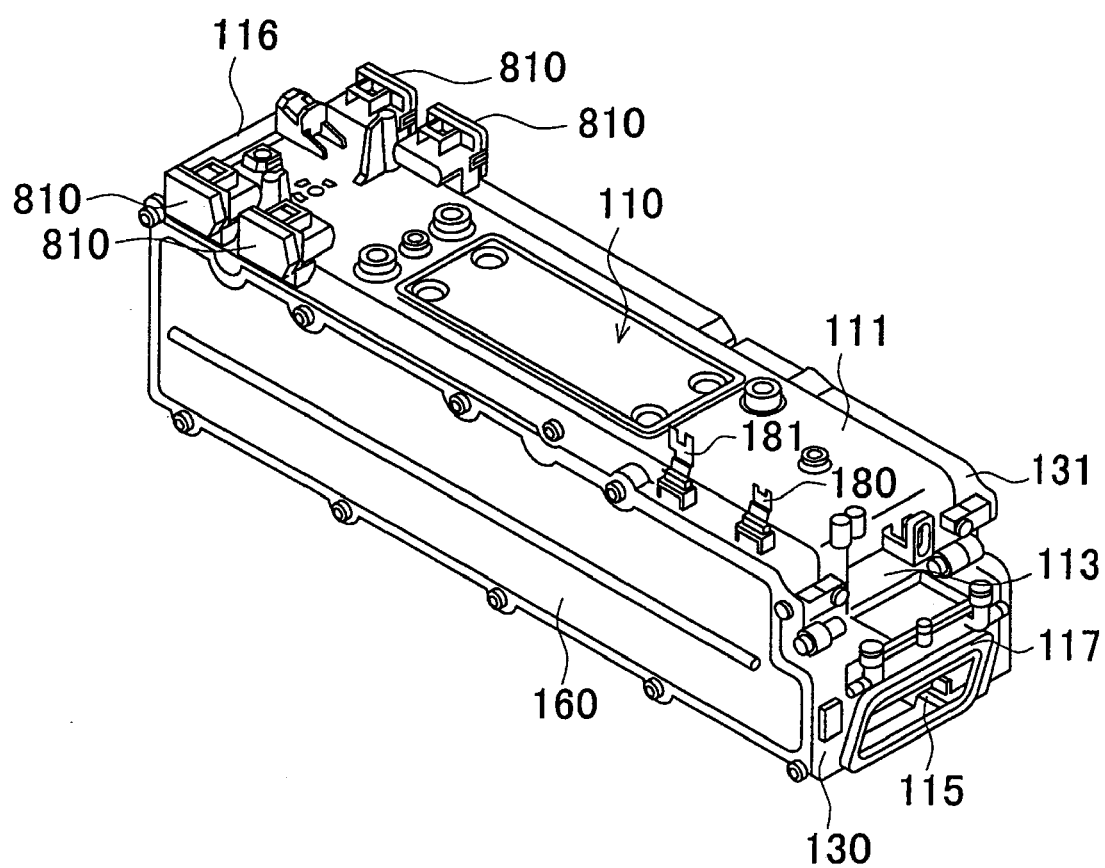
FIG. 14 is a perspective of the overall external structure assumed in one of the battery blocks in the battery module constituting the lithium ion battery device achieved in a second embodiment of the present invention.
Figure 15:
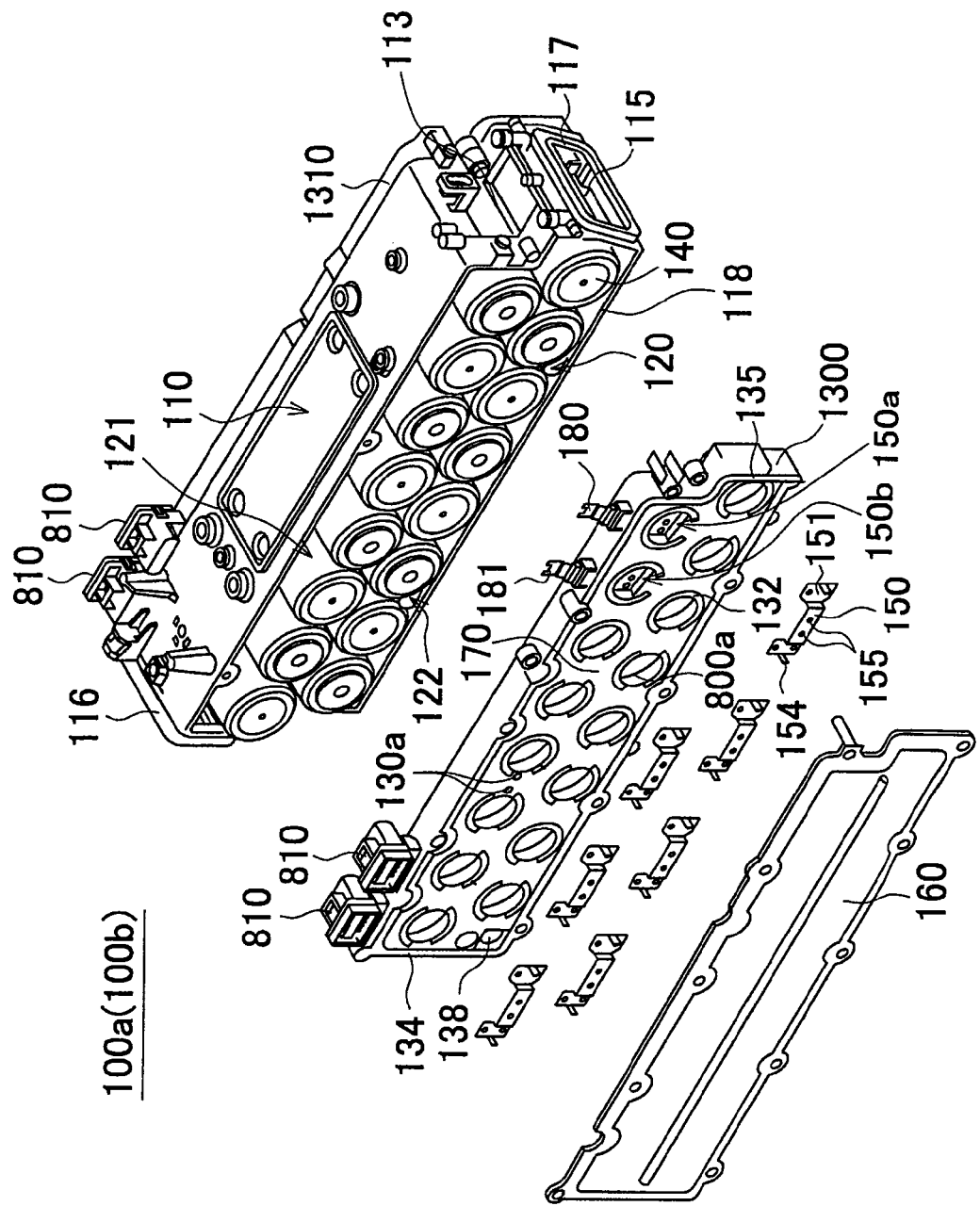
FIG. 15 is an exploded perspective of the structure shown in FIG. 14.

The second embodiment of the present invention is now described in reference to FIGS. 14 and 15.

The second embodiment, achieved as a variation of the first embodiment, adopts different structures for the side plates 130 and 131. The other structural features of the embodiment, particularly the basic structural features, i.e., the cooling chamber (storage chamber) enclosing the lithium ion battery cells 140 between the side plates 130 and 131 and the gas release chambers 170 formed on the two sides are identical to those of the first embodiment. Accordingly, the same reference numerals are assigned to structural elements fulfilling functions identical to those in the first embodiment so as to preclude the necessity for a repeated explanation thereof. The following explanation focuses on the structural features differentiating the embodiment from the first embodiment.

In the first embodiment, the conductive members 150 are embedded in the side plates 130 and 131 as integrated parts of the side plates 130 and 131. In addition, the connection lines 800 laid out to run over the surfaces of the side plates 130 and 131 on the side toward the lithium ion battery cells 140, are provided as elements independent of the side plates 130 and 131 in the first embodiment.

The relationship among these elements in the embodiment is the reverse of that assumed in the first embodiment. Namely, the conductive members 150 in the embodiment are structural elements independent of the side plates 130 and 131 (except for a conductive member 150a formed as an integrated part of a positive pole-side terminal 180 and a conductive member 150b formed as an integrated part of a negative pole-side terminal 181). The conductive members 150a and 150b are embedded in the side plates 130 and 131 as integrated parts of the side plates 130 and 131. In addition, connection lines (not shown) are embedded in the side plates 130 and 131, thereby integrating the connection lines with the side plates 130 and 131 in the embodiment. The connection lines are constituted with narrow rectangular metal wires constituted of, for instance, copper.

A front end portion 800a of each connection line is exposed over part of the corresponding through hole 132. The front end portion 800a is connected with a welding area 154 at an end of a conductive member 150 through welding after disposing the conductive member 150 at the side plate 130 or 131 so as to engage two projections 130a at the side plate 130 or 131 in two through holes 155 formed at the center of the conductive member 150 bent so as to project at the center and thus placing the front end portion 800a in contact with the fusing area 154.

The side of the connection line opposite from the front end portion 800a, formed by using the same material as that used to form the side plates 130 and 131, is formed as an integrated part of the side plate 130 or 131 and extends to a connector terminal 810 disposed at the upper end along the height-wise direction located on one side of the side plate 130 or 131 in the lengthwise direction. The connector terminal 810 includes a fuse (not shown) and electrically connects a wiring extending from the voltage detection connector at the controller (not shown) with the side of the connection line opposite from the front end portion 800a via the fuse.

In addition, liquid gaskets are used as seal members sealing any gap between the lithium ion battery cells 140 and the side plates 130 and 131 in the embodiment.

Furthermore, a separate outlet flow passage forming plate 118, independent of the module base (not shown) is used in the embodiment.

The high potential-side battery module 100a (low potential-side battery module 100b) is assembled by first attaching either the side plate 130 or the side plate 131 to the lithium ion battery cells 140 via liquid gaskets and then attaching the other side plate 131 or 130 to the lithium ion battery cells 140 via liquid gaskets. Next, conductive members 150 are disposed at either the side plate 130 or the side plate 131, the conductive members are welded onto the terminal surfaces at the individual lithium ion battery cells 140, and then the conductive members 150 disposed at the other side plate 131 or 130 are welded onto the terminal surfaces at the lithium ion battery cells 140. The subsequent assembly steps are substantially identical to step 4 and subsequent steps described in reference to the first embodiment.

Through the embodiment described above, advantages similar to those of the first embodiment are achieved.

While the battery module 100 described in reference to the two embodiments is achieved by connecting sixteen lithium ion battery cells 140, the present invention is not limited to the specific structure adopted in the battery module 100 or to the specific connection methods (serial/parallel) having been described. In other words, the present invention may be adopted in structures that include a different number of lithium ion battery cells 140, or a different number of battery cell rows and assume alternative arrays and arraying directions.

In addition, while the lithium ion battery cells 140 described in reference to the two embodiments are cylindrical battery cells, the present invention is not limited to this example and may be adopted in conjunction with lithium ion battery cells 140 with a square section or laminated battery cells. Furthermore, the present invention may be adopted in conjunction with batteries other than lithium ion batteries, such as nickel hydride batteries.

Either embodiment may be combined with a single variation or a plurality of variations. In addition, variations may be adopted in any conceivable combination.

In the embodiments of the present invention, the battery cells can be cooled over a greater area and, as a result, the battery cell cooling performance is improved over the related art. Consequently, a battery module assuring an improvement in the battery cell characteristics over the related art can be provided.

Furthermore, in the embodiments of the present invention, a substance emitted from the battery cells can be discharged to the outside instead of allowing it to collect within the battery module and thus, a battery module assuring an improvement in the emitted matter discharge performance over the related art can be provided.

The above described embodiments are examples, and various modifications can be made without departing from the scope of the invention.

What is claimed is:

1. A battery module, comprising:
a plurality of battery cells;
a casing in which the plurality of battery cells are housed;
a plurality of conductive members used to electrically connect the plurality of battery cells;
a first chamber, formed in the casing, in which the plurality of battery cells are disposed; and
a second chamber, formed in the casing and isolated from the first chamber, into which emitted matter from the battery cells is released, wherein:
the conductive members and the battery cells are connected together within the second chamber.

2. A battery module according to claim 1, wherein:
the first chamber constitutes a passage through which a medium used to cool the plurality of battery cells is distributed.

3. A battery module according to claim 1, further comprising:
a discharge mechanism, disposed at the casing, that discharges the emitted matter through a bottom area of the second chamber and guides the emitted matter to an external piping.

4. A battery module according to claim 1, further comprising:
a support member that supports the plurality of battery cells by holding the battery cells on two sides; and
a shield member disposed on a side of the support member opposite from a battery cell holding side on which the battery cells are held, wherein:
the second chamber is formed with the support member holding the plurality of battery cells and the shield member covering the support member on the side opposite from the battery cell holding side.

5. A battery module according to claim 4, wherein:
a seal member is inserted between the support member and each of the plurality of battery cells so as to fully isolate the first chamber and the second chamber from each other.

6. A battery module according to claim 4, wherein:
a seal member is inserted between the support member and the shield member so as to fully isolate the second chamber from outside.

7. A battery module according to claim 4, wherein:
the support member is made of an insulating material; and the conductive members are embedded in the support member.

8. A battery module according to claim 4, further comprising:
a plurality of voltage detection lines via which voltages at the plurality of battery cells are detected, wherein:
the voltage detection lines are laid out on the battery cell holding side of the support member and are connected to portions of the conductive members that are exposed on the battery cell holding side of the support member.

9. A battery module according to claim 4, wherein:
the conductive members are connected with the battery cells from side of the support member opposite from the battery cell holding side; and
through holes, through which the emitted matter having been released from the battery cells toward the second chamber passes, are formed at portions of the conductive members facing opposite the battery cells.

10. A battery device, comprising:
a battery module, according to claim 1, equipped with a plurality of battery cells; and
a controller that detects voltages at the plurality of battery cells and controls extents to which the plurality of battery cells are charged.

11. A battery device constituting an on-vehicle power source, comprising:
a battery module, according to claim 1, equipped with a plurality of battery cells; and
a controller that detects voltages at the plurality of battery cells and controls extents to which the plurality of battery cells are charged, wherein:
the battery module is connected with a piping installed in a vehicle so as to extend from the vehicle toward a road on which the vehicle travels, and the emitted matter having been emitted from the battery cells is discharged from the vehicle via the piping.

12. A battery module, comprising:
a plurality of battery cells;
a casing in which the plurality of battery cells are housed;
a plurality of conductive members used to electrically connect the plurality of battery cells;
a first chamber, formed in the casing, in which the plurality of battery cells are disposed; and
a second chamber, formed in the casing and isolated from the first chamber, into which emitted matter from the battery cells is released, wherein:
the plurality of conductive members are disposed against a direction in which the emitted matter is released from the battery cells toward the second chamber and each includes a through hole through which the emitted matter passes.

13. A battery module, comprising:
a plurality of battery cells;
a casing in which the plurality of battery cells are housed;
a first chamber, formed in the casing, in which the plurality of battery cells are disposed;
a second chamber, formed in the casing and isolated from the first chamber, into which emitted matter from the battery cells is released; and
a discharge mechanism, disposed at the casing, that discharges the emitted matter through a bottom portion of the second chamber and guides the emitted matter to an external piping.

14. A battery module, comprising:
a plurality of battery cells;
a casing in which the plurality of battery cells are housed;
a plurality of conductive members used to electrically connect the plurality of battery cells;
a support member that supports the plurality of battery cells by holding the battery cells on two sides; and
a shield member disposed on a side of the support member opposite from a battery holding side on which the battery cells are held, wherein:
a first chamber in which the plurality of battery cells are disposed and a second chamber into which emitted matter from the battery cells is released, are respectively formed in the casing on one side and on another side of the support member functioning as a partitioning wall;
the first chamber constitutes a passage through which a medium used to cool the plurality of battery cells passes;
a discharge mechanism that discharges the emitted matter through a bottom area of the second chamber and guides the emitted matter to an external piping is disposed at the support member; and
the conductive members and the battery cells are connected together within the second chamber.

* * * * *